(12) United States Patent
Xu et al.

(10) Patent No.: US 11,902,011 B2
(45) Date of Patent: Feb. 13, 2024

(54) RECONFIGURED UPLINK RESOURCE (PUR) FOR NON-TERRESTRIAL NETWORKS (NTN)

(71) Applicant: QUALCOMM Incorporated, San Diego, CA (US)

(72) Inventors: Huilin Xu, San Diego, CA (US); Jing Lei, San Diego, CA (US); Liangping Ma, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/145,967

(22) Filed: Jan. 11, 2021

(65) Prior Publication Data

US 2022/0224406 A1 Jul. 14, 2022

(51) Int. Cl.
*H04B 7/185* (2006.01)
*H04B 7/195* (2006.01)
*H04L 5/00* (2006.01)
*H04W 24/08* (2009.01)

(52) U.S. Cl.
CPC ..... *H04B 7/18539* (2013.01); *H04B 7/18589* (2013.01); *H04B 7/195* (2013.01); *H04L 5/0055* (2013.01); *H04W 24/08* (2013.01)

(58) Field of Classification Search
None
See application file for complete search history.

(56) References Cited

U.S. PATENT DOCUMENTS 10,484,983 B2\* 11/2019 Hakola ................. H04W 72/23
2022/0225132 A1\* 7/2022 Roy .................... H04B 7/18519

FOREIGN PATENT DOCUMENTS

WO WO-2021090266 A1 \* 5/2021 ........ H04W 52/0216

\* cited by examiner

*Primary Examiner* — Shripal K Khajuria
(74) *Attorney, Agent, or Firm* — MG-IP Law, P.C.

(57) ABSTRACT

In an aspect, a satellite-based non-terrestrial network configures multiple preconfigured uplink resources (PURs) for a user equipment (UE). The PURs may be configured one PUR per beam, one PUR per cell, or one PUR for multiple cells. A serving cell of the UE and one or more cells adjacent to the serving cell may each have an associated PUR. The UE selects one of the multiple PURs and sends a transmission using the selected PUR without the UE have a connection to the network. The network sends an ACK in response to the transmission. Either the UE or the network can specify that the UE is to transmit using a first PUR and receive the ACK on a second PUR. The UE can specify when and which PUR to use in the transmission and the network can specify when and which PUR to use in the ACK.

30 Claims, 15 Drawing Sheets

RECONFIGURED UPLINK RESOURCE (PUR) FOR NON-TERRESTRIAL NETWORKS (NTN)

BACKGROUND OF THE DISCLOSURE

1. Field of the Disclosure

Aspects of this disclosure relate generally to Non-Terrestrial Networks (NTN), and more particularly to the use of Pre-configured Uplink Resources (PURs).

2. Description of the Related Art

Wireless communications systems are widely deployed to provide various types of communication content, such as voice, video, packet data, messaging, broadcast, and so on. These systems may be capable of supporting communication with multiple users by sharing the available system resources (for example, time, frequency, and power). Examples of such multiple-access systems include fourth generation (4G) systems, such as Long-Term Evolution (LTE) systems, LTE-Advanced (LTE-A) systems, or LTE-A Pro systems, and fifth generation (5G) systems which may be referred to as New Radio (NR) systems. These systems may employ technologies, such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Standardization is ongoing to combine satellite-based communication systems with terrestrial wireless communications systems, such as 5G New Radio (NR) networks. In such a system, a user equipment (UE) accesses a satellite, also referred to as a space vehicle (SV), instead of a base station, which connects to an earth station, also referred to as a ground station or non-terrestrial network (NTN) gateway, which in turn connects to a 5G network either directly or via a base station. A 5G network thus treats the satellite system as another type of Radio Access Technology (RAT) distinct from, but also similar to, terrestrial 5G NR.

A preconfigured uplink resource (PUR) enables a UE to transmit uplink data without a Radio Resource Control (RRC) connection to a network. For example, a PUR may be used by a UE that periodically (e.g., every few seconds) transmits a small amount of sensor data to a network. The UE may, for example, report a moisture level of a portion of a farm, report output at an oil well, or another type of remote monitoring activity using a PUR.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In a first aspect, a method may include a User Equipment (UE) receiving, from a base station of a serving cell in a network comprising a plurality of mobile cells, a radio resource control release (RRC) message comprising configuration data associated with one or more preconfigured uplink resources (PURs). The one or more PURs enable the UE to perform a transmission without a connection to the network and without receiving a grant from the network for the transmission. The network includes a non-terrestrial network in which the plurality of mobile cells includes one or more satellites in a non-geosynchronous orbit. Each satellite of the one or more satellites comprises one or more beams. The one or more beams are associated with the plurality of mobile cells. Each of the one or more PURs are configured for each beam of the one or more beams. For example, the configuration data may include one or more beam identifiers, with each beam identifier of the one or more beam identifiers corresponding to each beam of the one or more beams. The method includes selecting, by the UE, a first PUR of the one or more PURs and transmitting a first transmission using the first PUR. The method includes pre-compensating, by the UE, an uplink channel propagation delay for the first transmission using the first PUR, based on a position of the UE and based on orbit information for the one or more satellites. The method includes selecting, by the UE, a second PUR of the one or more PURs, and transmitting a second transmission using the second PUR. A time interval between the first transmission and the second transmission may be between about one hundred milliseconds (ms) to about 10 seconds. In some cases, each PUR of the one or more PURs is configured for each mobile cell of the plurality of mobile cells. The UE is associated with the plurality of mobile cells and each PUR has a mobile cell identifier that identifies a particular mobile cell of the plurality of mobile cells. The configuration data includes time domain periodicity and offset and frequency domain recourses to perform the transmission. Two or more PURs of the one or more PURs are configured for transmission to a particular mobile cell of the plurality of mobile cells. The method includes receiving, by the UE, an acknowledgement (ACK) message after transmitting the first transmission using the first PUR. The acknowledgement message includes one or more of: (1) an indication whether was successfully received, (2) updated configuration data associated with the one or more PURs, or (3) an uplink timing advance. The method includes updating, by the UEm an uplink timing synchronization based at least in part on the uplink timing advance update to create updated uplink timing synchronization and transmitting a second transmission based on the updated uplink timing synchronization. The method includes receiving, by the UE, an acknowledgement message after transmitting the first transmission using the first PUR. The acknowledgement message is received on a downlink resource associated with a second PUR of the one or more PURs. The first transmission may include a start time (1) to use a second PUR for a second transmission or (2) to monitor an acknowledgement message on a downlink resource associated with a second PUR. The method may include receiving, by the UE, an acknowledgement message associated with the first transmission. The acknowledgement message may include a time for the UE (1) to use a different PUR to send an additional transmission or (2) to monitor a different downlink resource associated with a different PUR. The one or more PURs may include one PUR that is configured for multiple mobile cells.

In a second aspect, a user equipment (UE) may include one or more processors and one or more non-transitory computer-readable storage media to store instructions executable by the one or more processors to perform various operations. The UE is configured to receive, from a base station of a serving cell in a network comprising a plurality of mobile cells, a radio resource control release (RRC) message comprising configuration data associated with one or more preconfigured uplink resources (PURs). The one or more PURs enable the UE to perform a transmission without a connection to the network and without receiving a grant from the network for the transmission. The network includes a non-terrestrial network in which the plurality of mobile cells includes one or more satellites in a non-geosynchronous orbit. Each satellite of the one or more satellites comprises one or more beams. The one or more beams are associated with the plurality of mobile cells. Each of the one or more PURs are configured for each beam of the one or more beams. For example, the configuration data may include one or more beam identifiers, with each beam identifier of the one or more beam identifiers corresponding to each beam of the one or more beams. The UE is configured to select a first PUR of the one or more PURs and transmit a first transmission using the first PUR. The UE is configured to pre-compensate an uplink channel propagation delay for the first transmission using the first PUR, based on a position of the UE and based on orbit information for the one or more satellites. The UE is configured to select a second PUR of the one or more PURs, and transmit a second transmission using the second PUR. A time interval between the first transmission and the second transmission may be between about one hundred milliseconds (ms) to about 10 seconds. In some cases, each PUR of the one or more PURs is configured for each mobile cell of the plurality of mobile cells. The UE is associated with the plurality of mobile cells and each PUR has a mobile cell identifier that identifies a particular mobile cell of the plurality of mobile cells. The configuration data includes time domain periodicity and offset and frequency domain recourses to perform the transmission. Two or more PURs of the one or more PURs are configured for transmission to a particular mobile cell of the plurality of mobile cells. The UE is configured to receive an acknowledgement (ACK) message after transmitting the first transmission using the first PUR. The acknowledgement message includes one or more of: (1) an indication whether was successfully received, (2) updated configuration data associated with the one or more PURs, or (3) an uplink timing advance. The UE is configured to update an uplink timing synchronization based at least in part on the uplink timing advance update to create updated uplink timing synchronization and is configured to transmit a second transmission based on the updated uplink timing synchronization. The UE is configured to receive an acknowledgement message after transmitting the first transmission using the first PUR. The acknowledgement message is received on a downlink resource associated with a second PUR of the one or more PURs. The first transmission may include a start time (1) to use a second PUR for a second transmission or (2) to monitor an acknowledgement message on a downlink resource associated with a second PUR. The UE may be configured to receive an acknowledgement message associated with the first transmission. The acknowledgement message may include a time for the UE (1) to use a different PUR to send an additional transmission or (2) to monitor a different downlink resource associated with a different PUR. The one or more PURs may include one PUR that is configured for multiple mobile cells.

In a third aspect, one or more non-transitory computer-readable storage media store instructions executable by one or more processors of a user equipment (UE) to perform various operations. The instructions are executable by the one or more processors to receive, from a base station of a serving cell in a network comprising a plurality of mobile cells, a radio resource control release (RRC) message comprising configuration data associated with one or more preconfigured uplink resources (PURs). The one or more PURs enable the UE to perform a transmission without a connection to the network and without receiving a grant from the network for the transmission. The network includes a non-terrestrial network in which the plurality of mobile cells includes one or more satellites in a non-geosynchronous orbit. Each satellite of the one or more satellites comprises one or more beams. The one or more beams are associated with the plurality of mobile cells. Each of the one or more PURs are configured for each beam of the one or more beams. For example, the configuration data may include one or more beam identifiers, with each beam identifier of the one or more beam identifiers corresponding to each beam of the one or more beams. The instructions are executable by the one or more processors to select a first PUR of the one or more PURs and transmit a first transmission using the first PUR. The instructions are executable by the one or more processors to pre-compensate an uplink channel propagation delay for the first transmission using the first PUR, based on a position of the UE and based on orbit information for the one or more satellites. The instructions are executable by the one or more processors to select a second PUR of the one or more PURs, and to transmit a second transmission using the second PUR. A time interval between the first transmission and the second transmission may be between about one hundred milliseconds (ms) to about 10 seconds. In some cases, each PUR of the one or more PURs is configured for each mobile cell of the plurality of mobile cells. The UE is associated with the plurality of mobile cells and each PUR has a mobile cell identifier that identifies a particular mobile cell of the plurality of mobile cells. The configuration data includes time domain periodicity and offset and frequency domain recourses to perform the transmission. Two or more PURs of the one or more PURs are configured for transmission to a particular mobile cell of the plurality of mobile cells. The instructions are executable by the one or more processors to receive an acknowledgement (ACK) message after transmitting the first transmission using the first PUR. The acknowledgement message includes one or more of: (1) an indication whether was successfully received, (2) updated configuration data associated with the one or more PURs, or (3) an uplink timing advance. The instructions are executable by the one or more processors to update an uplink timing synchronization based at least in part on the uplink timing advance update to create updated uplink timing synchronization and is configured to transmit a second transmission based on the updated uplink timing synchronization. The instructions are executable by the one or more processors to receive an acknowledgement message after transmitting the first transmission using the first PUR. The acknowledgement message is received on a downlink resource associated with a second PUR of the one or more PURs. The first transmission may include a start time (1) to use a second PUR for a second transmission or (2) to monitor an acknowledgement message on a downlink resource associated with a second PUR. The instructions are executable by the one or more processors to receive an acknowledgement message associated with the first transmission. The acknowledgement message may include a time for the UE (1) to use a different PUR to send an additional transmission or (2) to monitor a different downlink resource associated with a different PUR. The one or more PURs may include one PUR that is configured for multiple mobile cells.

In a fourth aspect, a user equipment (UE) may include means for receiving, from a base station of a serving cell in a network comprising a plurality of mobile cells, a radio resource control release (RRC) message comprising configuration data associated with one or more preconfigured uplink resources (PURs). The one or more PURs enable the UE to perform a transmission without a connection to the network and without receiving a grant from the network for the transmission. The network includes a non-terrestrial network in which the plurality of mobile cells includes one or more satellites in a non-geosynchronous orbit. Each satellite of the one or more satellites comprises one or more beams. The one or more beams are associated with the plurality of mobile cells. Each of the one or more PURs are configured for each beam of the one or more beams. For example, the configuration data may include one or more beam identifiers, with each beam identifier of the one or more beam identifiers corresponding to each beam of the one or more beams. The UE includes means for selecting a first PUR of the one or more PURs and includes means for transmitting a first transmission using the first PUR. The UE includes means for pre-compensating an uplink channel propagation delay for the first transmission using the first PUR, based on a position of the UE and based on orbit information for the one or more satellites. The UE includes means for selecting a second PUR of the one or more PURs, and includes means for transmitting a second transmission using the second PUR. A time interval between the first transmission and the second transmission may be between about one hundred milliseconds (ms) to about 10 seconds. In some cases, each PUR of the one or more PURs is configured for each mobile cell of the plurality of mobile cells. The UE is associated with the plurality of mobile cells and each PUR has a mobile cell identifier that identifies a particular mobile cell of the plurality of mobile cells. The configuration data includes time domain periodicity and offset and frequency domain recourses to perform the transmission. Two or more PURs of the one or more PURs are configured for transmission to a particular mobile cell of the plurality of mobile cells. The UE includes means for receiving an acknowledgement (ACK) message after transmitting the first transmission using the first PUR. The acknowledgement message includes one or more of: (1) an indication whether was successfully received, (2) updated configuration data associated with the one or more PURs, or (3) an uplink timing advance. The UE includes means for updating an uplink timing synchronization based at least in part on the uplink timing advance update to create updated uplink timing synchronization and includes means for transmitting a second transmission based on the updated uplink timing synchronization. The UE includes means for receiving an acknowledgement message after transmitting the first transmission using the first PUR. The acknowledgement message is received on a downlink resource associated with a second PUR of the one or more PURs. The first transmission may include a start time (1) to use a second PUR for a second transmission or (2) to monitor an acknowledgement message on a downlink resource associated with a second PUR. The UE may include means for receiving an acknowledgement message associated with the first transmission. The acknowledgement message may include a time for the UE (1) to use a different PUR to send an additional transmission or (2) to monitor a different downlink resource associated with a different PUR. The one or more PURs may include one PUR that is configured for multiple mobile cells.

In a fifth aspect, a method includes transmitting, by an originating mobile cell in a network, to a user equipment (UE), a radio resource control (RRC) release message comprising configuration data associated with one or more PURs. The one or more PURs enable the UE transmit to the network without a connection to the network. The method includes, receiving, by a receiving mobile cell in the network, a first transmission from the UE using a first PUR of the one or more PURs. The network includes a non-terrestrial network and the mobile cells include a plurality of satellites in a non-geosynchronous orbit. The receiving mobile cell may, in some cases, be the originating mobile cell. In some cases, each of the one or more PURs are configured per beam and the configuration data includes a beam identifier that identifies a particular beam. In some cases, each PUR of the one or more PURs is configured per mobile cell, with the UE associated with a plurality of mobile cells, and each PUR has a mobile cell identifier that identifies one mobile cell of the plurality of mobile cells. The configuration data includes time domain periodicity and offset and frequency domain recourses for the UE to use for an uplink transmission. In some cases, two or more PURs are configured for uplink transmission to one mobile cell. In some cases, the one or more PURs comprise a single PUR that is configured for multiple mobile cells. In some cases, the receiving mobile cell includes a mobile cell that is different than the originating mobile cell. In response to the first transmission, the method includes transmitting an acknowledgement message, to the UE, that includes at least one of: (1) updated configuration data associated with the one or more PURs or (2) an uplink timing advance. The acknowledgement message may be transmitted on a downlink resource associated with a second PUR of the one or more PURs. The first transmission may include a start time: (1) to use a second PUR for a second transmission or (2) to monitor an acknowledgement message on a downlink resource associated with a second PUR. The acknowledgement message associated with the first transmission may include a time for the UE: (1) to use a different PUR or (2) to monitor a different downlink resource associated with a different PUR. At least one PUR configured to the UE may be used for another use before the UE enters a coverage area associated with the at least one PUR, in which the coverage area is based on a beam coverage area or on a cell coverage area.

In a sixth aspect, a network may include a plurality of mobile cells that each include one or more non-transitory computer-readable storage media to store instructions that are executable the one or more processors to perform various operations. An originating mobile cell in the network is configured to transmit, to a user equipment (UE), a radio resource control (RRC) release message comprising configuration data associated with one or more PURs. The one or more PURs enable the UE transmit to the network without a connection to the network. A receiving mobile cell in the network is configured to receive a first transmission from the UE using a first PUR of the one or more PURs. The network includes a non-terrestrial network and the mobile cells include a plurality of satellites in a non-geosynchronous orbit. The receiving mobile cell may, in some cases, be the originating mobile cell. In some cases, each of the one or more PURs are configured per beam and the configuration data includes a beam identifier that identifies a particular beam. In some cases, each PUR of the one or more PURs is configured per mobile cell, with the UE associated with a plurality of mobile cells, and each PUR has a mobile cell identifier that identifies one mobile cell of the plurality of mobile cells. The configuration data includes time domain periodicity and offset and frequency domain recourses for the UE to use for an uplink transmission. In some cases, two or more PURs are configured for uplink transmission to one mobile cell. In some cases, the one or more PURs comprise a single PUR that is configured for multiple mobile cells. In some cases, the receiving mobile cell includes a mobile cell that is different than the originating mobile cell. In response to the first transmission, an acknowledgement message is transmitted that includes at least one of: (1) updated configuration data associated with the one or more PURs or (2) an uplink timing advance. The acknowledgement message may be transmitted on a downlink resource associated with a second PUR of the one or more PURs. The first transmission may include a start time: (1) to use a second PUR for a second transmission or (2) to monitor an acknowledgement message on a downlink resource associated with a second PUR. The acknowledgement message may include a time for the UE: (1) to use a different PUR or (2) to monitor a different downlink resource associated with a different PUR. At least one PUR configured to the UE may be used for another use before the UE enters a coverage area associated with the at least one PUR, in which the coverage area is based on a beam coverage area or on a cell coverage area.

In a seventh aspect, a network may include a plurality of mobile cells. An originating mobile cell in the network includes one or more processors and one or more computer-readable media to store instructions executable by the one or more processors to perform various operations. For example, the instructions are executable to transmit, to a user equipment (UE), a radio resource control (RRC) release message comprising configuration data associated with one or more PURs. The one or more PURs enable the UE transmit to the network without a connection to the network. A receiving mobile cell in the network includes instructions that are executable to receive a first transmission from the UE using a first PUR of the one or more PURs. The network includes a non-terrestrial network and the mobile cells include a plurality of satellites in a non-geosynchronous orbit. The receiving mobile cell may, in some cases, be the originating mobile cell. In some cases, each of the one or more PURs are configured per beam and the configuration data includes a beam identifier that identifies a particular beam. In some cases, each PUR of the one or more PURs is configured per mobile cell, with the UE associated with a plurality of mobile cells, and each PUR has a mobile cell identifier that identifies one mobile cell of the plurality of mobile cells. The configuration data includes time domain periodicity and offset and frequency domain recourses for the UE to use for an uplink transmission. In some cases, two or more PURs are configured for uplink transmission to one mobile cell. In some cases, the one or more PURs comprise a single PUR that is configured for multiple mobile cells. In some cases, the receiving mobile cell includes a mobile cell that is different than the originating mobile cell. In response to the first transmission, the instructions are executable to transmit an acknowledgement message that includes at least one of: (1) updated configuration data associated with the one or more PURs or (2) an uplink timing advance. The acknowledgement message may be transmitted on a downlink resource associated with a second PUR of the one or more PURs. The first transmission may include a start time: (1) to use a second PUR for a second transmission or (2) to monitor an acknowledgement message on a downlink resource associated with a second PUR. The acknowledgement message may include a time for the UE: (1) to use a different PUR or (2) to monitor a different downlink resource associated with a different PUR. At least one PUR configured to the UE may be used for another use before the UE enters a coverage area associated with the at least one PUR, in which the coverage area is based on a beam coverage area or on a cell coverage area.

In an eighth aspect, a network may include a plurality of mobile cells. An originating mobile cell includes means for transmitting, to a user equipment (UE), a radio resource control (RRC) release message comprising configuration data associated with one or more PURs. The one or more PURs enable the UE transmit to the network without a connection to the network. A receiving mobile cell in the network includes means for receiving a first transmission from the UE using a first PUR of the one or more PURs. The network includes a non-terrestrial network and the mobile cells include a plurality of satellites in a non-geosynchronous orbit. The receiving mobile cell may, in some cases, be the originating mobile cell. In some cases, each of the one or more PURs are configured per beam and the configuration data includes a beam identifier that identifies a particular beam. In some cases, each PUR of the one or more PURs is configured per mobile cell, with the UE associated with a plurality of mobile cells, and each PUR has a mobile cell identifier that identifies one mobile cell of the plurality of mobile cells. The configuration data includes time domain periodicity and offset and frequency domain recourses for the UE to use for an uplink transmission. In some cases, two or more PURs are configured for uplink transmission to one mobile cell. In some cases, the one or more PURs comprise a single PUR that is configured for multiple mobile cells. In some cases, the receiving mobile cell includes a mobile cell that is different than the originating mobile cell. In response to the first transmission, the receiving mobile cell includes means for transmitting an acknowledgement message that includes at least one of: (1) updated configuration data associated with the one or more PURs or (2) an uplink timing advance. The acknowledgement message may be transmitted on a downlink resource associated with a second PUR of the one or more PURs. The first transmission may include a start time: (1) to use a second PUR for a second transmission or (2) to monitor an acknowledgement message on a downlink resource associated with a second PUR. The acknowledgement message may include a time for the UE: (1) to use a different PUR or (2) to monitor a different downlink resource associated with a different PUR. At least one PUR configured to the UE may be used for another use before the UE enters a coverage area associated with the at least one PUR, in which the coverage area is based on a beam coverage area or on a cell coverage area.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit

DETAILED DESCRIPTION

Figure 1:
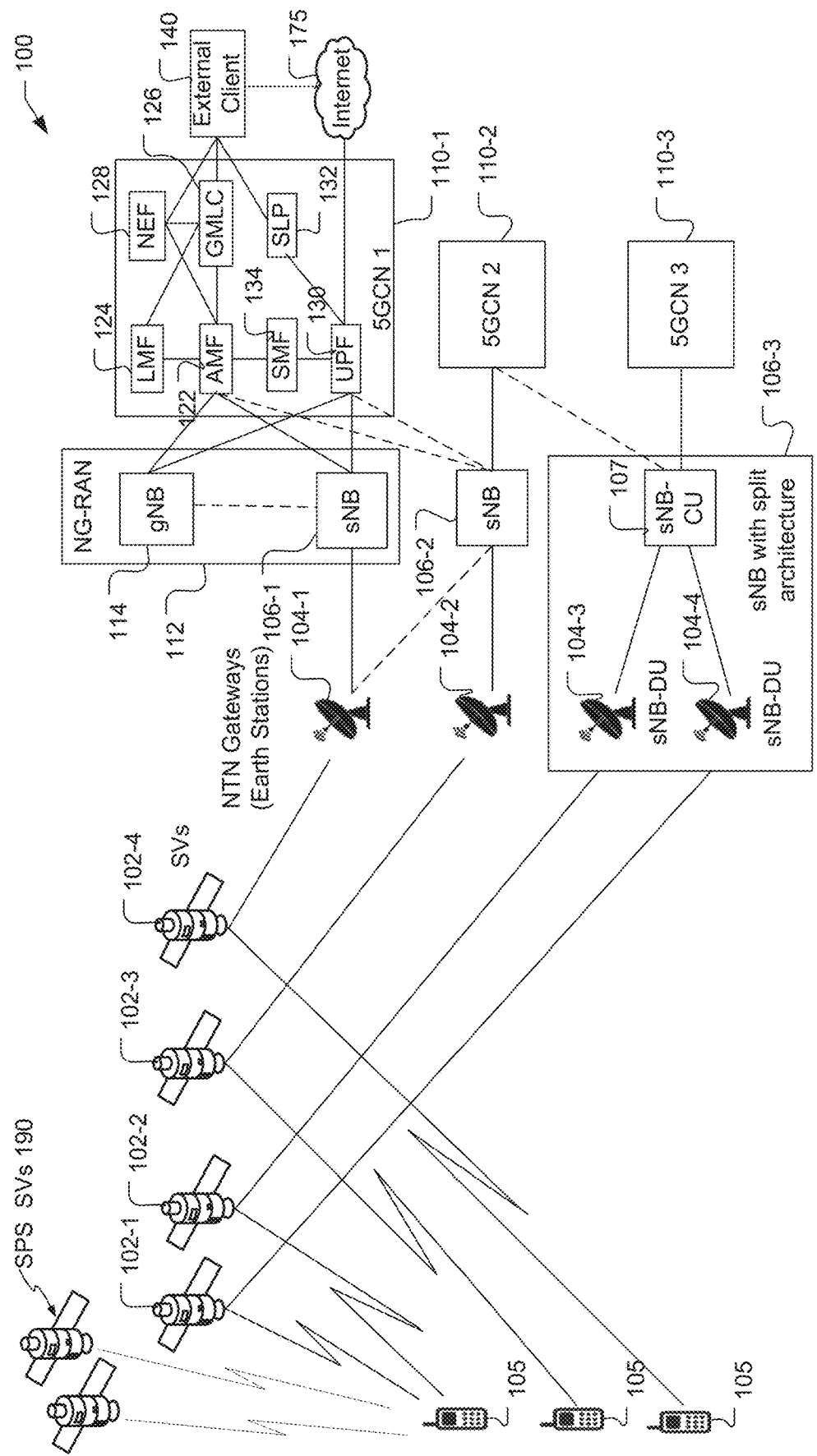
FIG. 1 is a diagram of a communication system that includes transparent space vehicles (SVs) that is capable of supporting satellite access to a wireless network, according to various aspects of the disclosure.

Disclosed are systems and techniques for extending Pre-configured Uplink Resource (PUR) configurations and Timing Advance (TA) validation rules for Non-Terrestrial networks (NTNs). In one aspect, the network (e.g., a base station, such as a next generation base station (gNB) or a satellite base station (sNB)) configures multiple PURs for a serving cell of the UE and for neighbor cells to the UE. The UE can transmit Uplink (UL) data using one of the multiple PURs without using a radio resource control (RRC) connection, without receiving a grant from the network for the transmission, and without performing a UL synchronization procedure when cell reselection occurs due to satellite movement.

A UE that uses a PUR is typically stationary or has low mobility. Being pre-configured, the PUR avoids the overhead of the steps taken to establish a RRC connection, thereby reducing UE power consumption. The base station may receive Uplink (UL) transmissions from multiple UEs by synchronizing timing to avoid one UL transmission from interfering with another UL transmission. A UE may use a PUR for a UL transmission when one or more specific Time Alignment (TA) validation rules are satisfied, such as, for example, the UE remains in a same serving cell. In a terrestrial network, a stationary or low mobility UE does not have issues with such a rule. However, for a Non-Terrestrial Network (NTN) in which satellites are in a non-Geosynchronous Equatorial Orbit (non-GEO) orbit, satellite movement may result in a stationary or low mobility UE frequently changing serving cells, particularly for Low Earth Orbit (LEO) systems. In such cases, the UE may fallback to an early data transmission or a RRC connected mode data transmission based on an existing PUR mechanism, thereby reducing the power savings provided by using a PUR.

In an NTN deployment, such as a deployment that uses Low Earth Orbit (LEO) satellites, the satellite orbit is stable and the satellite speed may be much higher than any mobile UE on the earth's surface. Therefore, cell reselection time for the UE is predictable. For a NTN, multiple beams can be radiated by each satellite. Thus, the relationship between a cell and a beam can be either (i) each cell has multiple beams or (ii) each cell has a single beam. In one aspect, in a NTN, the network provides a PUR for multiple cells. For example, the network may configure multiple PURs, with one PUR per beam to the UE. As another example, the network may configure multiple PURs to the UE, with one PUR per cell. As a further example, the network configures one PUR for multiple cells to UE. A UE that is an idle (e.g., inactive) mode uses the configured PUR for UL data transmission after the UE enters the coverage area of either (1) the beam or (2) the cell, when the PUR is configured on a beam level or on a cell level, respectively.

To enable the network to configure PURs on a per beam or a per cell basis, the network provides a beam identifier (ID) or a cell-ID in PUR configuration data sent by the network to the UE to indicate the associated PUR beam or associated PUR cell. The PUR configuration data may include time domain periodicity and offset as well as frequency domain recourses where the UE can perform a UL transmission. Though the PUR may be a reserved resource for particular UEs, after the PUR is configured for use by a UE, the network is able to use resources occupied by the PUR for other purposes when the UE is not using the PUR. For a non-GEO NTN, the beam switch time and cell reselection time for a UE is predictable. Therefore, the network can use resources occupied by the PUR associated with the UE for other purposes before the UE enters the coverage area (e.g., either beam coverage area or cell coverage area) of the PUR.

After the network has configured multiple PURs for use by the UE, the UE may select any PUR of the multiple PURs to perform UL transmissions. For example, if the UE is in a location in which the coverage area of two or more PURs overlaps, the UE may select a particular PUR of the two or more PURs.

The UE can calculate channel propagation delay between the UE and a satellite based on the UE's position and the satellite's orbit model, the UE can derive UL timing synchronization information and use this information to pre-compensate for UL propagation delay. Thus, the UE may pre-compensate UL channel propagation delay when data is transmitted on a PUR.

When the UE is in a location where coverage areas of two (or more) PURs overlap, the network and the UE may use more than one PUR to communicate with each other. After the network receives a UL transmission from the UE on the PUR, the network sends an acknowledgement (ACK) to the UE. The network uses the ACK to indicate whether the UL transmission was successfully decoded by the network. In addition, the network may use the ACK to include (i) an update to the PUR configuration and (ii) an update to an UL timing advance. For example, the UE may be located near the overlap of the coverage areas of two or more PURs and may send a UL transmission using a first PUR and then cross the boundary into a coverage area of a second PUR before the UE receives the PUR ACK. Thus, the UE may use a first PUR for an UL transmission and receive the ACK on the downlink channel associated with a second PUR. One technique to handle situations where more than one PUR is used is for the UE to provide, in the UL transmission, a time and a PUR ID. The time may indicate when the UE will begin transmitting using the PUR associated with the PUR ID or the time may indicate when the UE will begin monitoring the downlink channel associated with the PUR ID for an ACK. Another technique to handle situations where more than one PUR is used is for the network to provide, in the ACK, a time and a PUR ID. This information may instruct the UE to (1) begin transmitting using the PUR associated with the PUR ID at the specified time (e.g., specified in the ACK) or (2) begin monitoring the downlink channel associated with the PUR ID at the specified time for an ACK from the network. In this way, either the UE or the network can specify a PUR transition in which the UE sends UL transmission at a first particular time using a first PUR, the network transmits the ACK at a second particular time using the downlink channel associated with a second PUR, or both.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "example" are used herein to mean "serving as an example, instance, or illustration." Any aspect described herein as "example" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions.

A communication link through which UEs can send RF signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "radar signal," a "radio wave," a "waveform," or the like, or simply a "signal" where it is clear from the context that the term "signal" refers to a wireless signal or an RF signal.

FIG. 1 is a diagram of a communication system 100 capable of supporting satellite access using 5G New Radio (NR) or some other wireless access type, such as Code Division Multiple Access (CDMA), according to an aspect. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an ES without demodulating or decoding the signals. Similarly, a transparent SV may receive an UL signal from an ES and redirect the signal DL to served UEs without demodulating or decoding the signal. However, the SV may frequency convert received signals and may amplify and/or filter received signals before transmitting the signals.

The communication system 100 comprises a number of UEs 105, a number of SVs 102-1 to 102-4 (collectively referred to herein as SVs 102), a number of Non-Terrestrial Network (NTN) gateways 104-1 to 104-4 (collectively referred to herein as NTN gateways 104) (sometimes referred to herein simply as gateways 104, earth stations 104, or ground stations 104), a number of gNBs capable of communication with UEs via SVs 102 referred to herein as satellite NodeBs (sNBs) 106-1 to 106-3 (collectively referred to herein as sNBs 106). It is noted that the term sNB refers in general to an enhanced gNB with support for SVs and may be referred to as a gNB (e.g., in 3GPP). The communication system 100 is illustrated as further including components of a number of Fifth Generation (5G) networks including 5G Core Networks (5GCNs) 110-1 to 110-3 (collectively referred to herein as 5GCNs 110). The 5GCNs 110 may be public land mobile networks (PLMN) that may be located in the same or in different countries. FIG. 1 illustrates various components within 5GCN1 110-1 and a Next Generation (NG) Radio Access Network (RAN) (NG-RAN) 112 that may operate with 5GCN1 110-1. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

The communication system 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components Permitted connections in the communication system 100 having the network architecture with transparent SVs illustrated in FIG. 1, allow an sNB 106 to access multiple Earth stations 104 and/or multiple SVs 102. One sNB 106 may also be shared by multiple PLMNs (5GCNs 110), which may all be in the same country or possibly in different countries, and one Earth station 104 may be shared by more than one sNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, sNBs 106, NG-RAN 112, gNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. In some cases, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GCN 140), etc. The UE 105 may also support wireless communication using a Wireless Local Area Network (WLAN) which may connect to other networks (e.g., the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GNSS, GLONASS, Galileo or Beidou or some other local or regional Satellite Positioning System (SPS) such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (ACID), time of arrival (TOA), receive-transmit transmission-time difference (Rx-Tx) and/or other positioning methods.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g., for latitude, longitude and altitude above or below mean sea level).

The UEs 105 are configured to communicate with 5GCNs 110 via the SVs 102, earth stations 104, and sNBs 106. As illustrated by NG-RAN 112, the NG-RANs associated with the 5GCNs 110 may include one or more sNBs 106. The NG-RAN 112 may further include a number of terrestrial base stations, such as gNB 114. Pairs of terrestrial and/or satellite base stations, e.g., gNBs 114 and sNB 106-1 in NG-RAN 112 may be connected to one another using terrestrial links—e.g., directly as shown in FIG. 1 or indirectly via other gNBs 114 or sNBs 106 and communicate using an Xn interface. Access to the 5G network is provided to UEs 105 via wireless communication between each UE 105 and a serving sNB 106, via an SV 102 and an earth station 104. The sNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more sNBs 106 and/or gNBs 114 in NG-RAN 112—e.g., directly or indirectly via other sNBs 106, gNBs 114 and/or other ng-eNBs. An ng-eNB may provide LTE wireless access and/or evolved LTE (eLTE) wireless access to a UE 105.

An sNB 106 may be referred to by other names such as a gNB, "satellite node" or "satellite access node." The sNBs 106 are not the same as terrestrial gNB 114, but may be based on a terrestrial gNB 114 with additional capability. For example, an sNB 106 may terminate the radio interface and associated radio interface protocols to UEs 105 and may transmit DL signals to UEs 105 and receive UL signals from UEs 105 via SVs 102 and ESs 104. An sNB 106 may also support signaling connections and voice and data bearers to UEs 105 and may support handover of UEs 105 between different radio cells for the same SV 102, between different SVs 102 and/or between different sNBs 106. In some systems, an sNB 106 may be referred to as a gNB or as an enhanced gNB. SNBs 106 may be configured to manage moving radio beams (for LEO SVs) and associated mobility of UEs 105. The sNBs 106 may assist in the handover (or transfer) of SVs 102 between different Earth stations 104, different sNBs 106, and between different countries. The sNBs 106 may hide or obscure specific aspects of connected SVs 102 from the 5GCN 110, e.g., by interfacing to a 5GCN 110 in the same way or in a similar way to a gNB 114, and may avoid a 5GCN 110 from having to maintain configuration information for SVs 102 or perform mobility management related to SVs 102. The sNBs 106 may further assist in sharing of SVs 102 over multiple countries. The sNBs 106 may communicate with one or more earth stations 104, e.g., as illustrated by sNB 106-2 communicating with earth stations 104-2 and 104-1. The sNBs 106 may be separate from earth stations 104, e.g., as illustrated by sNBs 106-1 and 106-2, and earth stations 104-1 and 104-2. The sNBs 106 may include or may be combined with one or more earth stations 104, e.g., using a split architecture. For example, sNB 106-3 is illustrated with a split architecture, with an sNB central unit (sNB-CU) 107 and the earth stations 104-3 and 104-4 acting as Distributed Units (DUs). An sNB 106 may, in some cases, be fixed on the ground with transparent SV operation. In one implementation, one sNB 106 may be physically combined with, or physically connected to, one ES 104 to reduce complexity and cost.

The earth stations 104 may be shared by more than one sNB 106 and may communicate with UE 105 via the SVs 102. An earth station 104 may be dedicated to just one SVO and to one associated constellation of SV 102 and hence may be owned and managed by the SVO. While earth stations 104 may be included within an sNB 106, e.g., as an sNB-DU within sNB 106-3, this may only occur when the same SVO or the same MNO owns both the sNB 106 and the included ESs 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR and LTE communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of a RAN location server function may be applicable to such other networks.

The sNBs 106 and gNBs 114 may communicate with an Access and Mobility Management Function (AMF) 122 in a 5GCN 110, which, for positioning functionality, may communicate with a Location Management Function (LMF) 124. For example, the sNBs 106 may provide an N2 interface to the AMF 122. An N2 interface between an sNB 106 and a 5GCN 110 may be the same as an N2 interface supported between a gNB 114 and a 5GCN 110 for terrestrial NR access by a UE 105 and may use the Next Generation Application Protocol (NGAP) defined in 3GPP Technical Specification (TS) 38.413 between an sNB 106 and the AMF 122. The AMF 122 may support mobility of the UE 105, including cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from the GMLC 126. The LMF 124 may be connected to AMF 122 and/or to GMLC 126. In some aspects, a node/system that implements the LMF 124 may additionally or alternatively implement other types of location-support modules, such as an Enhanced Serving Mobile Location Center (E-SMLC). It is noted that in some aspects, at least part of the positioning functionality (including derivation of a UE 105's location) may be performed at the UE 105 (e.g., using signal measurements obtained by UE 105 for signals transmitted by SVs 120, SVs 190, gNBs 114 and assistance data provided to the UE 105, e.g., by LMF 124).

The Gateway Mobile Location Center (GMLC) 126 may support a location request for the UE 105 received from an external client 140 and may forward such a location request to the AMF 122 for forwarding by the AMF 122 to the LMF 124 or may forward the location request directly to the LMF 124. A location response from the LMF 124 (e.g., containing a location estimate for the UE 105) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 1 though only one of these connections may be supported by 5GCN 110 in some implementations.

A Network Exposure Function (NEF) 128 may be included in 5GCN 110. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet 175. The UPF 130 may be connected to sNBs 106 and gNBs 114. UPF 130 functions may include: external Protocol Data Unit (PDU) session point of interconnect to a Data Network, packet (e.g., Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such aspects, the 5GCN 110 may be configured to control different air interfaces. For example, in some aspects, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs with the network architecture shown in FIG. 1 may impact the communication system as follows. The 5GCN 110 may treat a satellite RAT as a new type of RAT (e.g., having longer delay, reduced bandwidth and higher error rate). Consequently, while there may be some impact to Protocol Data Unit (PDU) session establishment and mobility management (MM) and connection management (CM) procedures. Impacts to an AMF 122 (or LMF 124) may be small—e.g., such as providing pre-configured data for fixed tracking areas (TAs) and cells to a UE 105 during Registration. There may be no impact to the SVs 102. The SVs 102 may be shared with other services (e.g., satellite TV, fixed Internet access) with 5G NR mobile access for UEs added in a transparent manner. This may enable legacy SVs 102 to be used and may avoid the need to deploy a new type of SV 102. Further, the sNBs 106 may be fixed and may be configured to support one country and one or more PLMNs in that country. The sNBs 106 may need to assist assignment and transfer of SVs 102 and radio cells between sNBs 106 and earth stations 104 and support handover of UEs 105 between radio cells, SVs 102 and other sNBs 106. Thus, the sNB 106 may differ from a terrestrial gNB 114. Additionally, a coverage area of an sNB 106 may be much larger than the coverage area of a gNB 114.

In some implementations, the radio beam coverage of an SV 102 may be large, e.g., up to or greater than 1000 kms across, and may provide access to more than one country. An earth station 104 may be shared by multiple sNBs (e.g., earth station 104-1 may be shared by sNBs 106-1 and 106-2), and an sNB 106 may be shared by multiple core networks in separate PLMNs located in the same country or in different countries (e.g., sNB 106-2 may be shared by 5GCN1 110-1 and 5GCN2 110-1, which may be in different PLMNs in the same country or in different countries).

Figure 2:
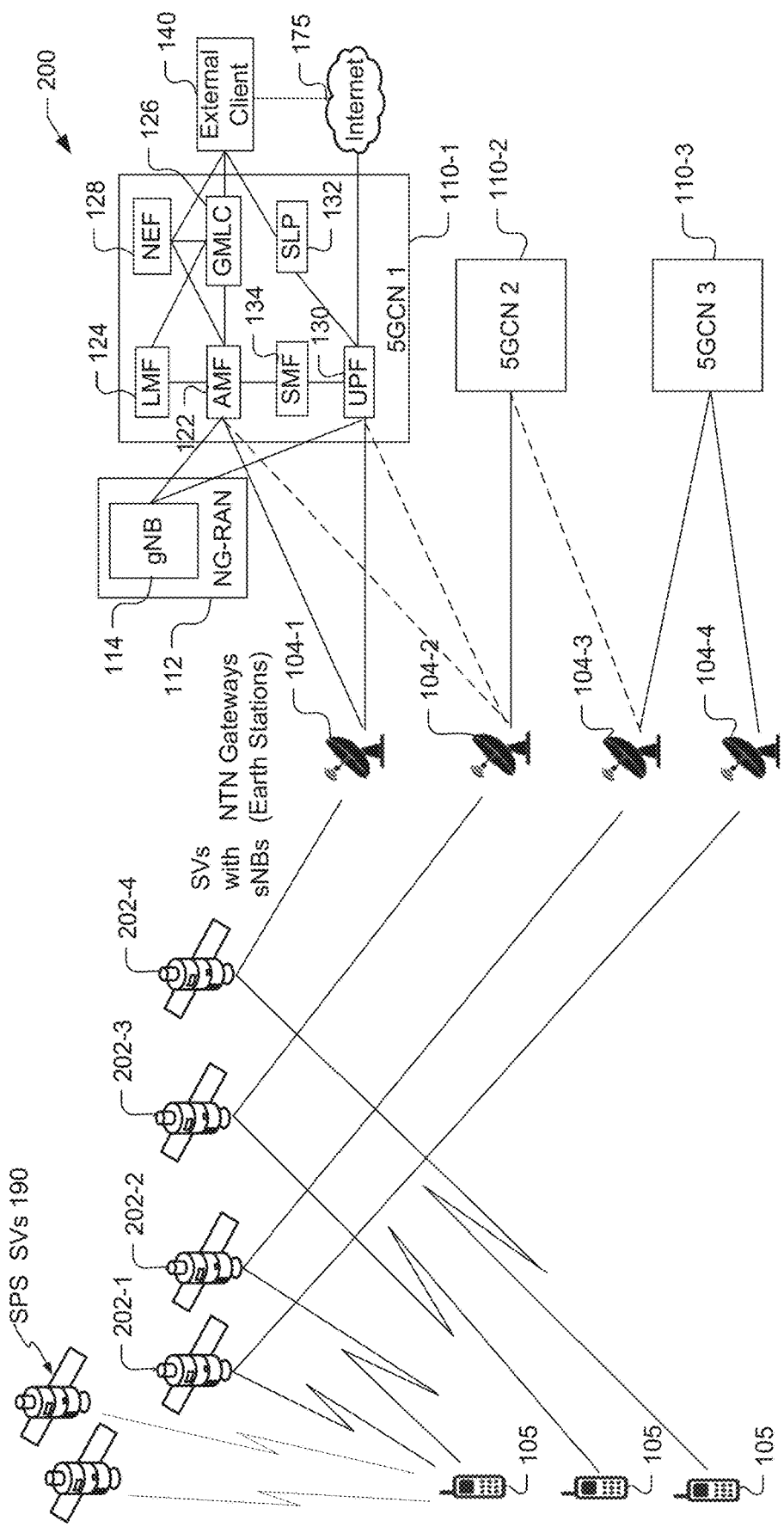
FIG. 2 is a diagram of a communication system that includes regenerative SVs that is capable of supporting satellite access to a wireless network, according to various aspects of the disclosure.

FIG. 2 is a diagram of a communication system 200 capable of supporting satellite access using 5G New Radio (NR) or some other wireless access type such as Code Division Multiple Access (CDMA), according to an aspect. The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board sNB 202 (or at least the functional capabilities of an sNB), and is sometimes referred to herein as an SV/sNB 202. Reference to an sNB 202 is used herein when referring to SV/sNB 202 functions related to communication with UEs 105 and 5GCNs 110, whereas reference to an SV 202 is used when referring to SV/sNB 202 functions related to communication with ESs 104 and with UEs 105 at a physical radio frequency level. However, there may be no precise delimitation of an SV 202 versus an sNB 202.

An onboard sNB 202 may perform some or all of the same functions as an sNB 106 as described previously. For example, an sNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. An sNB 202 may also support signaling connections and voice and data bearers to UEs 105 and may support handover of UEs 105 between different radio cells for the same sNB 202 and between different sNBs 202. The sNBs 202 may assist in the handover (or transfer) of SVs 202 between different Earth stations 104, different 5GCNs 110, and between different countries. The sNBs 202 may hide or obscure specific aspects of SVs 202 from the 5GCN 110, e.g., by interfacing to a 5GCN 110 in the same way or in a similar way to a gNB 114. The sNBs 202 may further assist in sharing of SVs 202 over multiple countries. The sNBs 202 may communicate with one or more earth stations 104 and with one or more 5GCNs 110 via the ESs 104. In some implementations, sNBs 202 may communicate directly with other sNBs 202 using Inter-Satellite Links (ISLs) (not shown in FIG. 2), which may support an Xn interface between any pair of sNBs 202.

With LEO SVs, an SV/sNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN2 110-2, and earth stations 104-3 and 104-4 are connected to 5GCN3 110-3. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2, and earth station 104-3 may be connected to both 5GCN2 110-2 and 5GCN3 110-3. The 5GCN 110 may need to be aware of SV 202 coverage areas in order to page UEs 105 and to manage handover. Thus, as can be seen, the network architecture with regenerative SVs may have more impact and complexity with respect to both sNBs 202 and 5GCNs 110 than the network architecture with transparent SVs 102 shown in FIG. 1.

Support of regenerative SVs with the network architecture shown in FIG. 2 may impact the communication system 200 as follows. The 5GCN 110 may be impacted if fixed TAs and cells are not supported, since core components of mobility management and regulatory services, which may, in some cases, be based on fixed cells and fixed TAs for terrestrial PLMNs, would have to be replaced by a new system (e.g., based on UE 105 location). If fixed TAs and fixed cells are supported, a 5GCN 110 (e.g., the AMF 122) may need to map any fixed TA to one or SVs 202 with current radio coverage of the TA when performing paging of a UE 105 that is located in this TA. This could require configuration in the 5GCN 110 of long term orbital data for SVs 202 (e.g., obtained from an SVO for SVs 202) and could add significant new impact to a 5GCN 110.

Legacy SVs would need a substantial software (SW) update to support sNB 202 functions, which may not be feasible. An SV 202 would also need to fully support all UEs 105 accessing the SV 202, which could be problematic with a legacy SV due to limited processing and storage capability. Hence, an SV 202 would probably need to comprise new hardware (HW) and SW rather than being based on a SW upgrade to an existing SV. A new SV/sNB 202 may need to support regulatory and other requirements for multiple countries. A GEO SV 202 coverage area may include several or many countries, whereas a LEO or medium earth orbit (MEO) SV 202 may orbit over many countries. Support of fixed TAs and fixed cells may then require that a SV/sNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/sNB 202 complexity and at the expense of more 5GCN 110 complexity. Additionally, SV/sNB 202 to SV/sNB 202 ISLs may change dynamically as relative SV/sNB 202 positions change, making Xn related procedures more complex.

Figure 3:
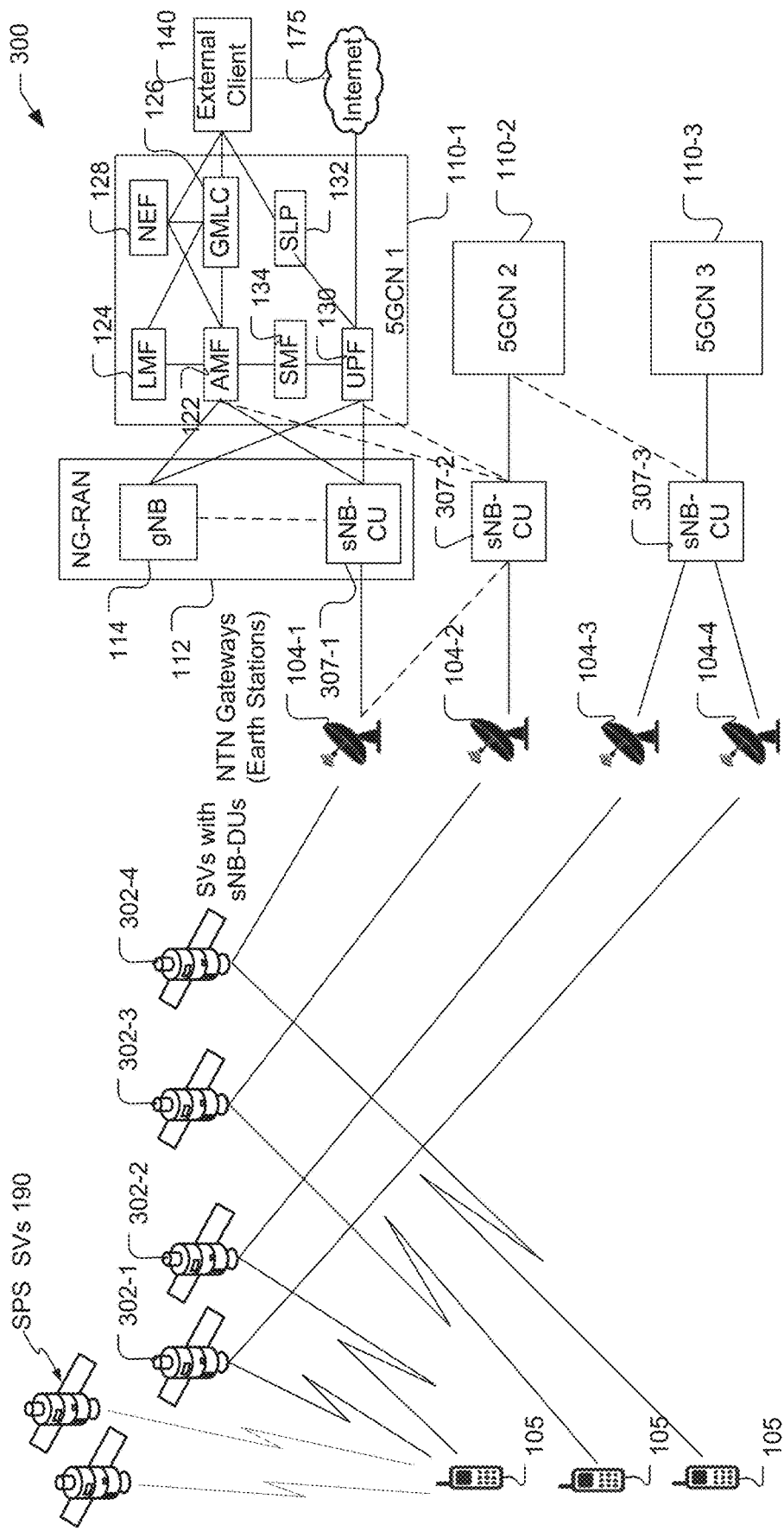
FIG. 3 is a diagram of a communication system that includes regenerative SVs and a split satellite Node B (sNB) architecture that is capable of supporting satellite access to a wireless network, according to various aspects of the disclosure.

FIG. 3 is a diagram of a communication system 300 capable of supporting satellite access using 5G New Radio (NR) or some other wireless access type such as Code Division Multiple Access (CDMA), according to an aspect. The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the sNBs. A regenerative SV 302, unlike a transparent SV 102, includes an on-board sNB Distributed Unit (sNB-DU) 302, and is sometimes referred to herein as an SV/sNB-DU 302. Reference to an sNB-DU 302 is used herein when referring to SV/sNB 302 functions related to communication with UEs 105 and sNB-CUs 307, whereas reference to an SV 302 is used when referring to SV/sNB-DU 302 functions related to communication with ESs 104 and with UEs 105 at a physical radio frequency level. However, there may be no precise delimitation of an SV 302 versus an sNB-DU 302.

Each sNB-DU 302 communicates with one ground based sNB-CU 307 via one or more ESs 104. One sNB-CU 307 together with the one or more sNB-DUs 302 which are in communication with the sNB-CU 307 performs functions, and may use internal communication protocols, which are similar to or the same as a gNB with a split architecture as described in 3GPP TS 38.401. Here an sNB-DU 302 corresponds to and performs functions similar to or the same as a gNB Distributed Unit (gNB-DU) defined in TS 38.401, while an sNB-CU 307 corresponds to and performs functions similar to or the same as a gNB Central Unit (gNB-CU) defined in TS 38.401. For example, an sNB-DU 302 and an sNB-CU 307 may communicate with one another using an F1 Application Protocol (F1AP) as defined in 3GPP TS 38.473 and together may perform some or all of the same functions as an sNB 106 or sNB 202 as described previously. To simplify references to different types of sNB is the description below, an sNB-DU 302 may sometimes be referred to an sNB 302 (without the "DU" label), and an sNB-CU 307 may sometimes be referred to an sNB 307 (without the "CU" label).

An sNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. An sNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of an sNB-DU 302 is partly controlled by the associated sNB-CU 307. One sNB-DU 302 may support one or more NR radio cells for UEs 105. An sNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. An sNB-CU 307 may also be split into separate control plane (sNB-CU-CP) and user plane (sNB-CU-UP) portions, where an sNB-CU-CP communicates with one or more AMFs 122 in one more 5GCNs 110 using the NGAP protocol and where an sNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. An sNB-DU 302 and sNB-CU 307 may communicate over an F1 interface to (a) support control plane signaling for a UE 105 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

An sNB-CU 307 may communicate with one or more other sNB-CUs 307 and/or with one more other gNBs 114 using terrestrial links to support an Xn interface between any pair of sNB-CUs 307 and/or between any sNB-CU 307 and any gNB 114.

An sNB-DU 302 together with an sNB-CU 307 may: (i) support signaling connections and voice and data bearers to UEs 105; (ii) support handover of UEs 105 between different radio cells for the same sNB-DU 302 and between different sNB-DUs 302; and (iii) assist in the handover (or transfer) of SVs 302 between different Earth stations 104, different 5GCNs 110, and between different countries. An sNB-CU 307 may hide or obscure specific aspects of SVs 302 from a 5GCN 110, e.g., by interfacing to a 5GCN 110 in the same way or in a similar way to a gNB 114. The sNB-CUs 307 may further assist in sharing of SVs 302 over multiple countries.

In communication system 300, the sNB-DUs 302 that communicate with and are accessible from any sNB-CU 307 will change over time with LEO SVs 302. With the split sNB architecture, a 5GCN 110 may connect to fixed sNB-CUs 307 which do not change over time and which may reduce difficulty with paging of a UE 105. For example, a 5GCN 110 may not need to know which SV/sNB-DUs 302 are needed for paging a UE 105. The network architecture with regenerative SVs 302 with a split sNB architecture may thereby reduce 5GCN 119 impact at the expense of additional impact to an sNB-CU 307.

Support of regenerative SVs 302 with a split sNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of RAT with longer delay, reduced bandwidth and higher error rate. Consequently, while there may be some impact to PDU session establishment and Mobility Management (MM) and Connection Management (CM) procedures, impacts to an AMF 122 (or LMF 124) may be small—e.g., such as providing pre-configured data for fixed TA and fixed cells to a UE 105 during Registration. The impact on SV/sNB-DUs 302 may be less than the impact on SV/sNBs 202 (with non-split architecture), as discussed above in reference to FIG. 2. The SV/sNB-DU 302 may need to manage changing association with different (fixed) sNB-CUs 307. Further, an SV/sNB-DU 302 may need to manage radio beams and radio cells. The sNB-CU 307 impacts may be similar to sNB 106 impacts for a network architecture with transparent SVs 102, as discussed above, except for extra impacts to manage changing associations with different sNB-DUs 302 and reduced impacts to support radio cells and radio beams which may be transferred to sNB-DUs 302.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SDOs are widely known to the industry.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complication. For example, if a beam is shared by two or more countries, earth stations 104 and sNBs 106/202/302/307 in one country may need to support UE 105 access from other countries. Sharing a beam over multiple countries may raise security issues for privacy of both data and voice. Further, sharing an SV beam over multiple countries may raise regulatory conflicts. For example, regulatory services including WEA, LI, and EM calls in a first country could need support from sNBs 106/202/307 and earth stations 104 in a second country that shares the same SV beam.

A first solution to complications raised by beam sharing amongst multiple countries may be to assign one beam to one country. The assignment of a beam to a single country additionally implies assigning each radio cell to one country. This solution may not preclude or prevent beam and radio cell coverage of additional countries, but can restrict UE access to a beam and associated radio cell to just UEs 105 in the country to which the beam and associated radio cell are assigned. A second solution for beam sharing over multiple countries could be to allow a 5GCN 110 in one country to support UEs 105 located in other countries where regulatory approval for this was obtained from the other countries. A third solution could be to share an sNB 106/202/307 among 5GCNs 110 located in different countries (e.g., as in the case of sNB 106-2, sNB 202-2 and sNB 307-2 shown in FIGS. 1-3), and to verify that each UE 105 accessing the sNB 106/202/307 is registered in and connected to a 5GCN 110 that is in the same country as the UE 105 or permitted to serve the country in which the UE 105 is located.

Figure 4:
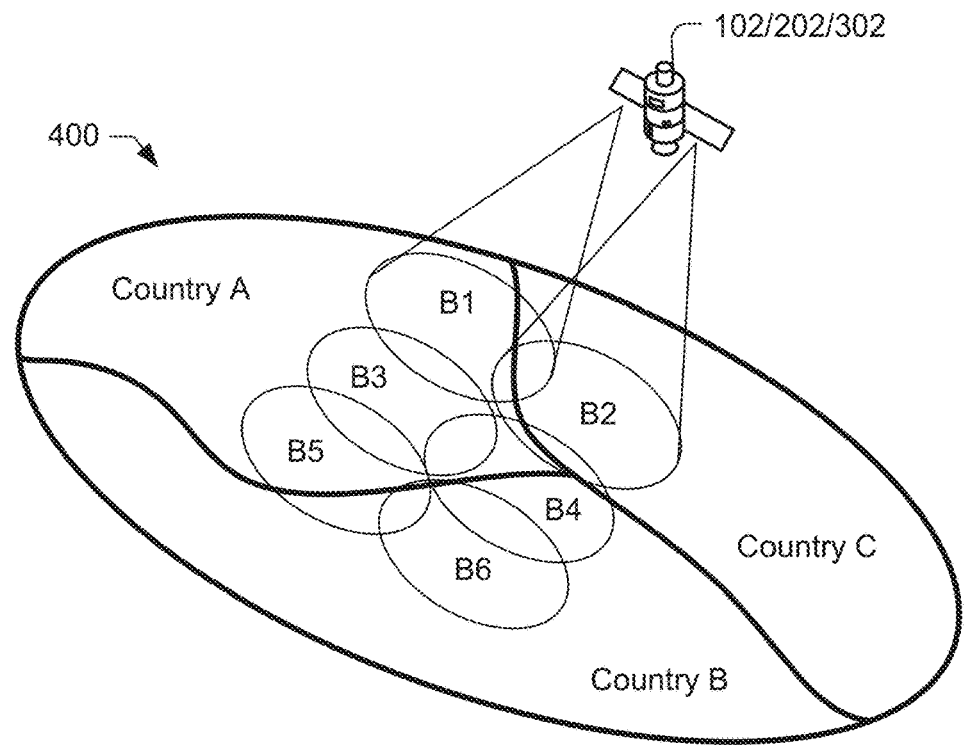
FIG. 4 illustrates a system in which an SV generates multiple beams over an area that includes multiple locations, according to various aspects of the disclosure.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country as for the first solution above, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new earth station 104 or new sNB 106 or 307.

Figure 5:
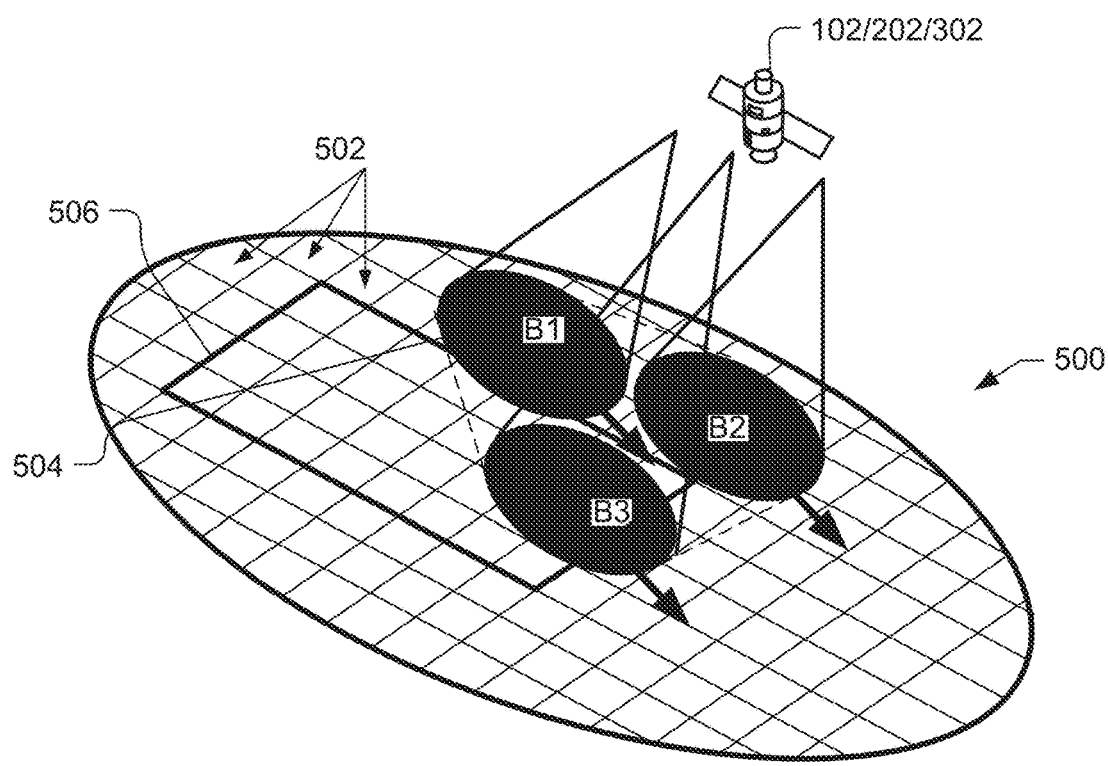
FIG. 5 illustrates a system in which radio cells are created by an SV over an area that includes a number of fixed cells, according to various aspects of the disclosure.

FIG. 5 illustrates radio cells produced by an SV 102, 202, 302 over an area 500 that includes a number of Earth fixed cells 502. A radio cell may comprise a single beam or multiple beams, e.g., all beams in a radio cell may use the same frequency or a radio cell may comprise one beam for each frequency in a set of different frequencies. For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202. 302 may overlap with many 5GCN terrestrial cells. When supporting satellite access to a wireless network, radio beams and radio cells produced by an SV 102, 202, 302 may be hidden from a 5GCN 110.

As illustrated in FIG. 5, an area 500 may include a number of Earth fixed cells 502, as well as fixed tracking areas (TAs) such as TA 506. Fixed cells are not "real cells," e.g., used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a radio cell which may change with time for a LEO or MEO SV. A fixed cell 502 may be treated by a 5GCN 110 the same as a cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in communication systems 200, each radio cell may remain with the same SV 202 and may have a moving coverage area supporting different 5GCNs 110 at different times.

With transparent SVs 102 and regenerative SVs 302 for a split architecture as in communication system 300, each radio cell may be assigned to and controlled by one sNB 106 or 307 on behalf of one or more PLMNs in one country. For a GEO SV 102/302, the assignment to an sNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For an NGEO SV 102/302, the assignment might last for a short time, e.g., only 5-15 minutes. A non-permanent radio cell may then be transferred to a new sNB 106/307 as necessary (e.g., when access to the NGEO SV 102/302 is transferred to the new sNB 106/307). Each sNB 106/307, for example, may have a fixed geographic coverage area, e.g., comprising a plurality of fixed cells 502 and fixed TAs. A radio cell for a first NGEO SV 102/302 may be transferred from a first sNB 106/307 to a second sNB 106/307 when (or after) moving into the fixed coverage area of the second sNB 106/307. Prior to this transfer, UEs 105 accessing the radio cell in a connected state may be moved to a new radio cell for the first sNB 106/307 or could be handed off to the second sNB 106/307 as part of transferring the radio cell. An SV 102/302 may be accessed from only one sNB 106/307 or from multiple sNBs 106/307, possibly in different countries. In one implementation, an SV 102/302 may be assigned to multiple sNBs 106/307 by partitioning radio cells produced by the SV 102/302 among the different sNBs 106/307. Radio cells may then be transferred to new sNBs 106/307 (and to new countries) as the SV 102/302 moves or as traffic demands change. Such an implementation would be a form of a soft handoff in which SV 102/302 transfer from one sNB 106/307 to another sNB 106/307 occurs in increments of radio cells and not all at once.

Figure 6:
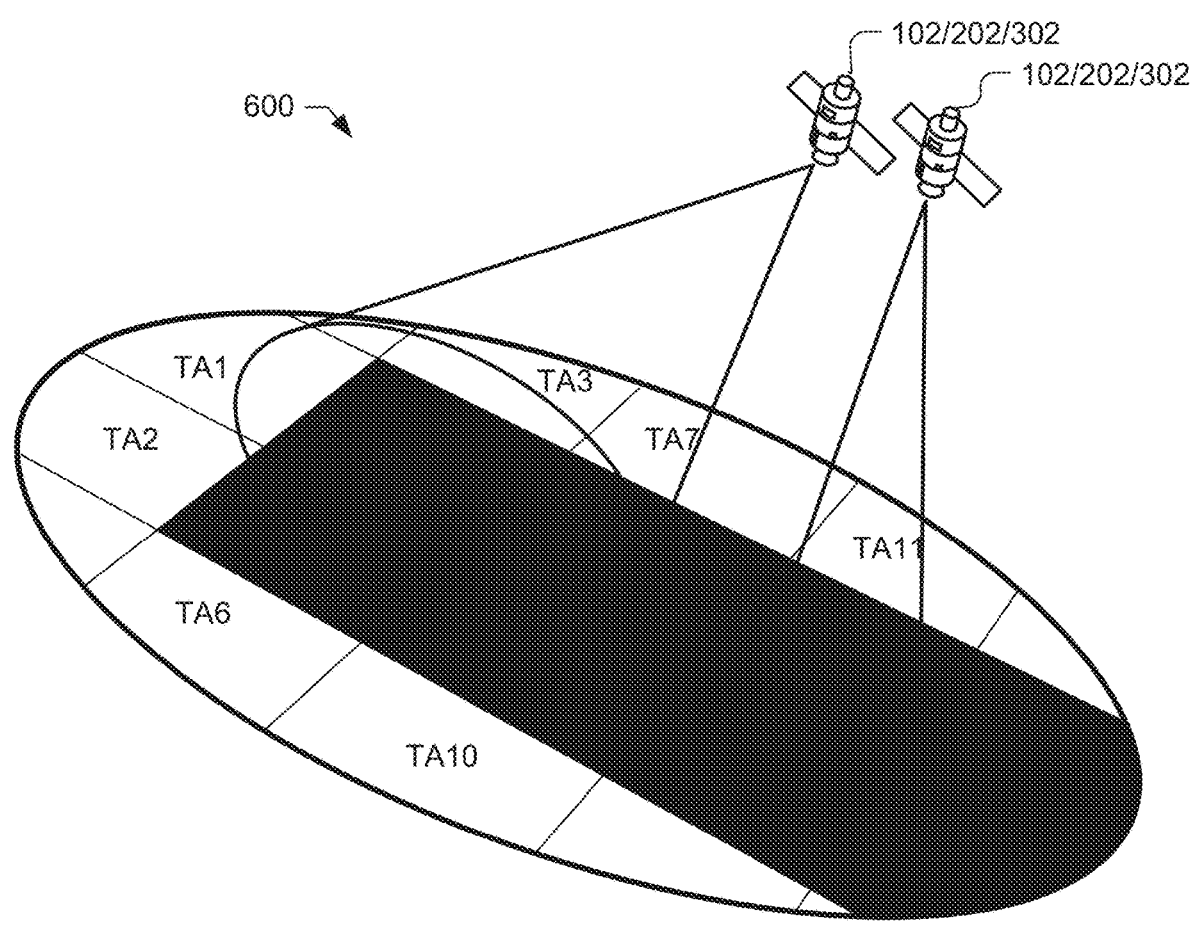
FIG. 6 illustrates a system in which radio cells produced by an SV are assigned to fixed tracking areas (TAs), according to various aspects of the disclosure.

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to an sNB1 (which may be an sNB 106, sNB 202 or an sNB 307), and TA12, TA13, TA14, and TA15 are assigned to an sNB2 (which may be another sNB 106, 202 or 307). In one implementation, a radio cell may be considered to support a fixed TA if the radio cell is wholly within the TA (e.g., Cell 2 within TA 12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TAS, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g., where the ID of TA comprises a Tracking Area Code (TAC)). For an NGEO SV, the supported PLMNs and TAs may change as radio cell coverage areas change. An sNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g., Cell 1 and Cell 2). An sNB 106/202/307 may then update SIB broadcasting.

Thus, as illustrated in FIG. 6, an SV 102/202/302 may broadcast for cell 1 a SIB that includes TACs for TA4 and possibly TA1, TA3, TAS, TA8 and/or TA9. Similarly, the SV 102/202/302 or another SV 102/202/302 may broadcast for Cell 2 a SIB that includes a TAC for TA12 only. The Cell 1 may be assigned to sNB1 (which has coverage of TA4, TAS, TA8, and TA9) and Cell 2 may be assigned to sNB2 (which has coverage of TA12, TA13, TA14, and TA15). Cell 1 and Cell 2 may be transferred from sNB1 to sNB2 or from sNB2 to sNB1 if the cell coverage area moves from one sNB area to another.

The coverage area for a fixed TA may be defined in a manner that is simple, precise, flexible and requires minimal signaling for conveyance to a UE 105 or sNB 106/202/307. A fixed TA area may be small enough to allow efficient paging by comprising an area supported by just a few radio cells (e.g., less than 20) and may also be large enough to avoid excessive UE registration (e.g., may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or sNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

Figure 7A:
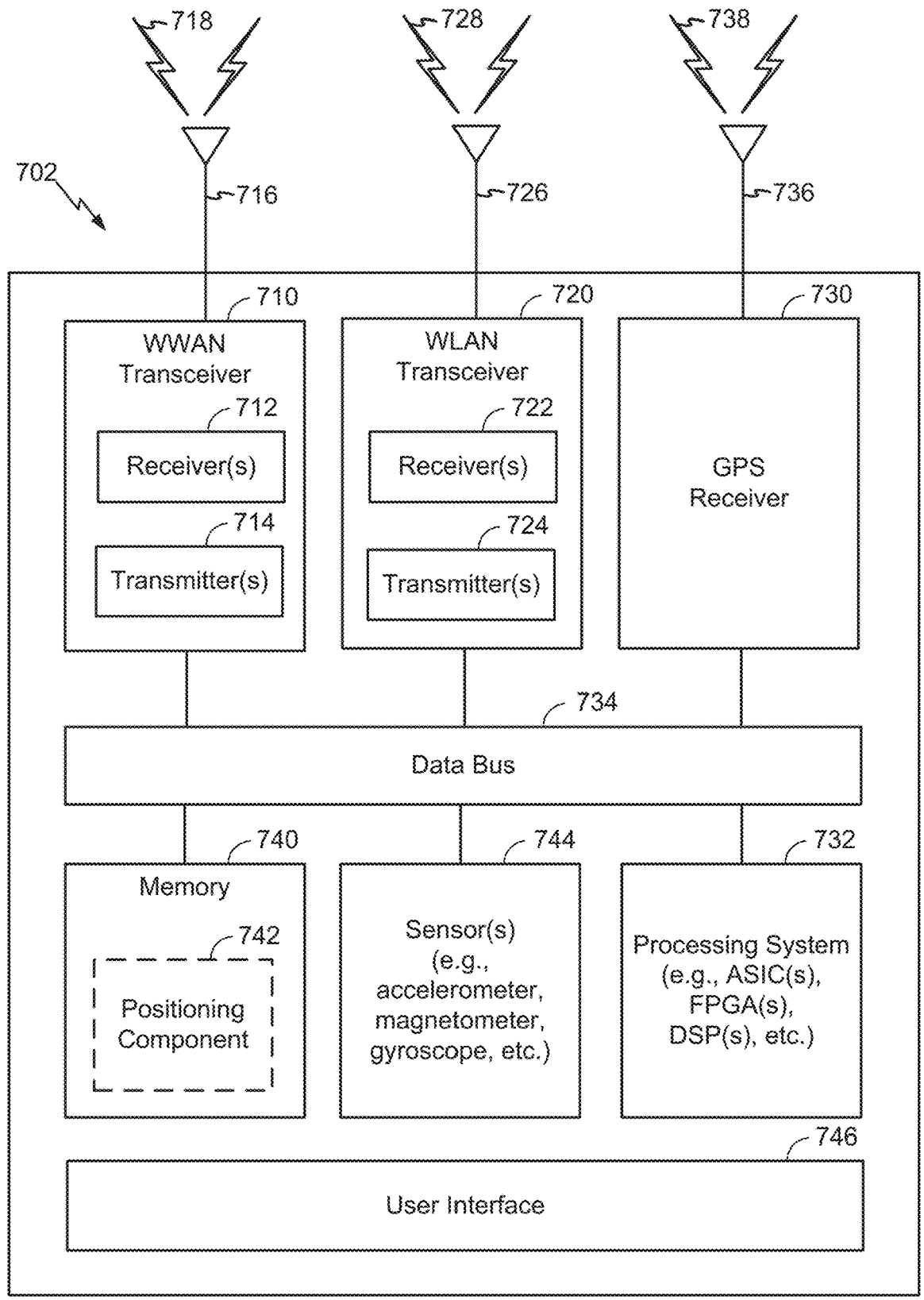
FIGS. 7A to 7C are simplified block diagrams of several sample aspects of components that may be employed in a UE, a non-terrestrial vehicle, and a network entity, respectively, according to various aspects of the disclosure.
Figure 7B:
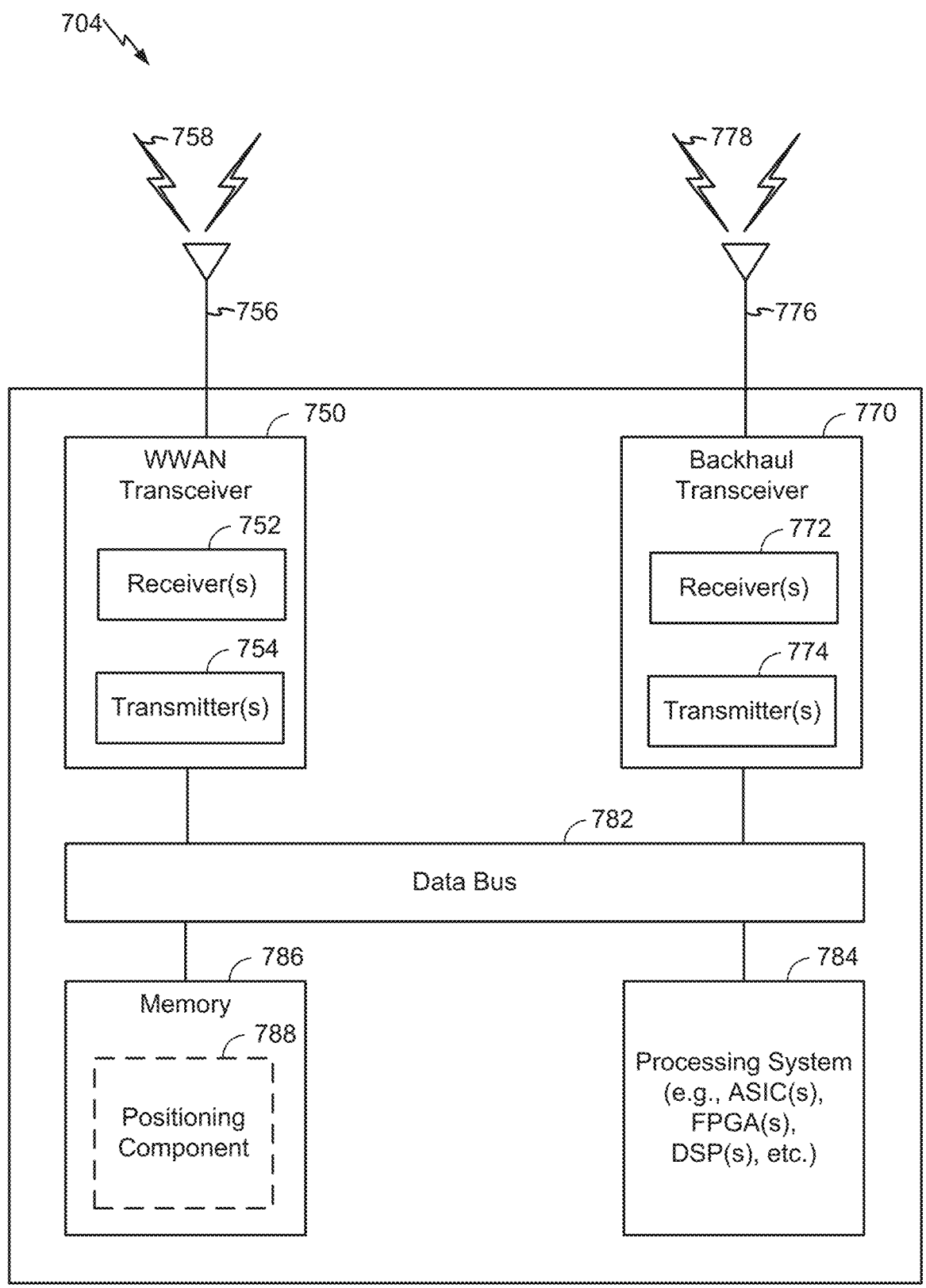
Figure 7C:
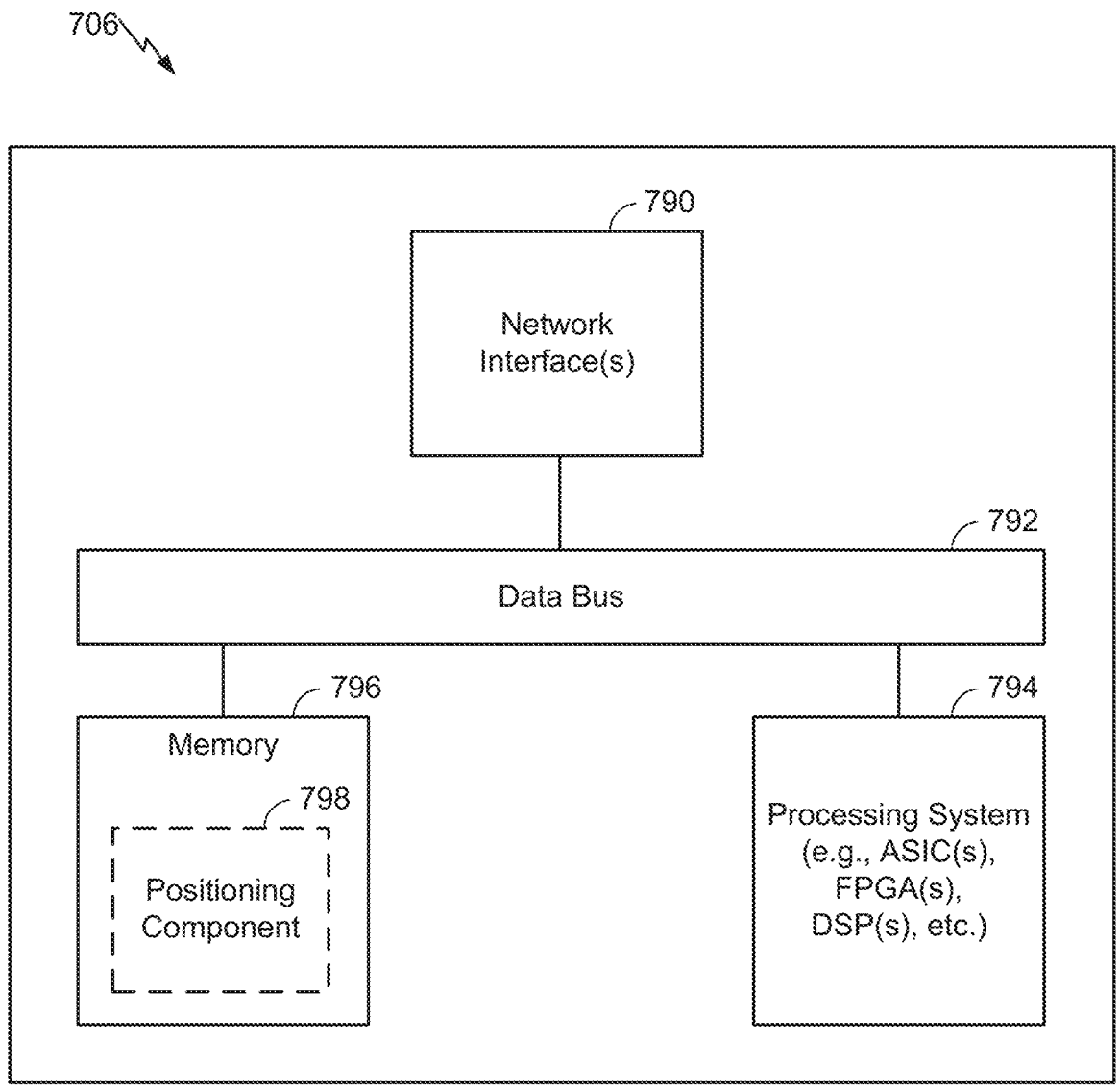

FIGS. 7A, 7B, and 7C illustrate several example components (represented by corresponding blocks) that may be incorporated into a UE 702 (which may correspond to any of the UEs described herein, such as UE 105 in FIGS. 1-3), a non-terrestrial vehicle 704 (which may correspond to any of the non-terrestrial vehicles described herein, such as SVs 102, 202, 302 and sNBs 202 and 302), and a network entity 706 (which may correspond to or embody any of the network functions described herein, including the sNB 106, the sNB 307, LMF 124, the SLP 132, AMF 122, SMF 134, NTN gateways 104, etc.) to support the wireless positioning operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 702 and the non-terrestrial vehicle 704 each include wireless wide area network (WWAN) transceivers 710 and 750, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 710 and 750 may be connected to one or more antennas 716 and 756, respectively, for communicating with other network nodes, such as other UEs, access points, base stations (e.g., ng-eNBs, gNBs), non-terrestrial vehicles, etc., via at least one designated RAT (e.g., NR, LTE, GSM, etc.) over a wireless communication medium of interest (e.g., some set of time/frequency resources in a particular frequency spectrum). The WWAN transceivers 710 and 750 may be variously configured for transmitting and encoding signals 718 and 758 (e.g., messages, indications, information, and so on), respectively, and, conversely, for receiving and decoding signals 718 and 758 (e.g., messages, indications, information, pilots, and so on), respectively, in accordance with the designated RAT. Specifically, the transceivers 710 and 750 include one or more transmitters 714 and 754, respectively, for transmitting and encoding signals 718 and 758, respectively, and one or more receivers 712 and 752, respectively, for receiving and decoding signals 718 and 758, respectively.

The UE 702 also includes, at least in some cases, a wireless local area network (WLAN) transceiver 720. The WLAN transceiver 720 may be connected to one or more antennas 726 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceiver 720 may be variously configured for transmitting and encoding signals 728 (e.g., messages, indications, information, and so on), and, conversely, for receiving and decoding signals 728 (e.g., messages, indications, information, pilots, and so on), in accordance with the designated RAT. Specifically, the WLAN transceiver 720 includes one or more transmitters 724 for transmitting and encoding signals 728, and one or more receivers 722 for receiving and decoding signals 728.

The non-terrestrial vehicle 704 includes at least one backhaul transceiver 770. The backhaul transceiver(s) 770 may be connected to one or more antennas 776 for wirelessly communicating with a gateway (e.g., an NTN gateway 104) and/or other non-terrestrial vehicles over a wireless communication medium of interest. The backhaul transceiver(s) 770 may be variously configured for transmitting and encoding signals 778 (e.g., messages, indications, information, and so on), and, conversely, for receiving and decoding signals 778 (e.g., messages, indications, information, pilots, and so on), in accordance with the designated RAT (e.g., NR). Specifically, the backhaul transceiver(s) 770 includes one or more transmitters 774 for transmitting and encoding signals 778, and one or more receivers 772 for receiving and decoding signals 778. Note that although illustrated as separate components, the backhaul transceiver(s) 770 may be the same as or included in the WWAN transceiver(s) 750.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 716, 726, 756, 776), such as an antenna array, that permits the respective apparatus to perform transmit "beamforming," as described herein. Similarly, a receiver may include or be coupled to a plurality of antennas (e.g., antennas 716, 726, 756, 776), such as an antenna array, that permits the respective apparatus to perform receive beamforming, as described herein. In an aspect, the transmitter and receiver may share the same plurality of antennas (e.g., antennas 716, 726, 756, 776), such that the respective apparatus can only receive or transmit at a given time, not both at the same time. A wireless communication device (e.g., the WWAN transceivers 710 and 750, the WLAN transceiver 720, and/or the backhaul transceiver 770) of the UE 702 and/or the non-terrestrial vehicle 704 may also comprise a network listen module (NLM) or the like for performing various measurements.

The UE 702 also includes, at least in some cases, a global positioning systems (GPS) receiver 730. The GPS receiver 730 may be connected to one or more antennas 736 and may provide for receiving and/or measuring GPS signals 738. The GPS receiver 730 may comprise any suitable hardware and/or software for receiving and processing GPS signals 738. The GPS receiver 730 requests information and operations as appropriate from the other systems, and performs calculations necessary to determine the UE's 702 position using measurements obtained by any suitable GPS algorithm.

The network entity 706 includes at least one network interface 790 providing means for communicating (e.g., means for transmitting, means for receiving, etc.) with other network entities. For example, the network interface(s) 790 (e.g., one or more network access ports) may be configured to communicate with one or more network entities via a wire-based or wireless backhaul connection. In some aspects, the network interface(s) 790 may be implemented as one or more transceivers configured to support wire-based and/or wireless signal communication (e.g., where the network entity 706 is a gateway in communication with a non-terrestrial vehicle 704). This communication may involve, for example, sending and receiving messages, parameters, or other types of information.

The UE 702, the non-terrestrial vehicle 704, and the network entity 706 also include other components that may be used in conjunction with the operations as disclosed herein. The UE 702 includes processor circuitry implementing a processing system 732 for providing functionality relating to, for example, positioning operations, and for providing other processing functionality. The non-terrestrial vehicle 704 includes a processing system 784 for providing functionality relating to, for example, positioning operations as disclosed herein, and for providing other processing functionality. The network entity 706 includes a processing system 794 for providing functionality relating to, for example, positioning operations as disclosed herein, and for providing other processing functionality. The processing systems 732, 784, and 794 may therefore provide means for processing, such as means for determining, means for calculating, means for receiving, means for transmitting, means for indicating, etc. In an aspect, the processing systems 732, 784, and 794 may include, for example, one or more general purpose processors, multi-core processors, ASICs, digital signal processors (DSPs), field programmable gate arrays (FPGA), or other programmable logic devices or processing circuitry.

The UE 702, the non-terrestrial vehicle 704, and the network entity 706 include memory circuitry implementing memory components 740, 786, and 796 (e.g., each including a memory device), respectively, for maintaining information (e.g., information indicative of reserved resources, thresholds, parameters, and so on). The memory components 740, 786, and 796 may therefore provide means for storing, means for retrieving, means for maintaining, etc. In some cases, the UE 702, the non-terrestrial vehicle 704, and the network entity 706 may include positioning components 742, 788, and 798, respectively. The positioning components 742, 788, and 798 may be hardware circuits that are part of or coupled to the processing systems 732, 784, and 794, respectively, that, when executed, cause the UE 702, the non-terrestrial vehicle 704, and the network entity 706 to perform the functionality described herein. In other aspects, the positioning components 742, 788, and 798 may be external to the processing systems 732, 784, and 794 (e.g., part of a modem processing system, integrated with another processing system, etc.). Alternatively, the positioning components 742, 788, and 798 may be memory modules (as shown in FIGS. 7A-C) stored in the memory components 740, 786, and 796, respectively, that, when executed by the processing systems 732, 784, and 794 (or a modem processing system, another processing system, etc.), cause the UE 702, the non-terrestrial vehicle 704, and the network entity 706 to perform the functionality described herein.

The UE 702 may include one or more sensors 744 coupled to the processing system 732 to provide means for sensing or detecting movement and/or orientation information that is independent of motion data derived from signals received by the WWAN transceiver 710, the WLAN transceiver 720, and/or the GPS receiver 730. By way of example, the sensor(s) 744 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 744 may include a plurality of different types of devices and combine their outputs in order to provide motion information. For example, the sensor(s) 744 may use a combination of a multi-axis accelerometer and orientation sensors to provide the ability to compute positions in 2D and/or 3D coordinate systems.

In addition, the UE 702 includes a user interface 746 providing means for providing indications (e.g., audible and/or visual indications) to a user and/or for receiving user input (e.g., upon user actuation of a sensing device such a keypad, a touch screen, a microphone, and so on). Although not shown, the non-terrestrial vehicle 704 and the network entity 706 may also include user interfaces.

Referring to the processing system 784 in more detail, in the downlink, IP packets from the network entity 706 may be provided to the processing system 784 via the backhaul transceiver(s) 770. The processing system 784 may implement functionality for an RRC layer, a packet data convergence protocol (PDCP) layer, a radio link control (RLC) layer, and a medium access control (MAC) layer. The processing system 784 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 754 and the receiver 752 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 754 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially pre-coded to produce multiple spatial streams. Channel estimates from a channel estimator may be used to determine the coding and modulation scheme, as well as for spatial processing. The channel estimate may be derived from a reference signal and/or channel condition feedback transmitted by the UE 702. Each spatial stream may then be provided to one or more different antennas 756. The transmitter 754 may modulate an RF carrier with a respective spatial stream for transmission.

At the UE 702, the receiver 712 receives a signal through its respective antenna(s) 716. The receiver 712 recovers information modulated onto an RF carrier and provides the information to the processing system 732. The transmitter 714 and the receiver 712 implement Layer-1 functionality associated with various signal processing functions. The receiver 712 may perform spatial processing on the information to recover any spatial streams destined for the UE 702. If multiple spatial streams are destined for the UE 702, they may be combined by the receiver 712 into a single OFDM symbol stream. The receiver 712 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the non-terrestrial vehicle 704. These soft decisions may be based on channel estimates computed by a channel estimator. The soft decisions are then decoded and de-interleaved to recover the data and control signals that were originally transmitted by the non-terrestrial vehicle 704 on the physical channel. The data and control signals are then provided to the processing system 732, which implements Layer-3 and Layer-2 functionality.

In the uplink, the processing system 732 provides demultiplexing between transport and logical channels, packet reassembly, deciphering, header decompression, and control signal processing to recover IP packets from the core network. The processing system 732 is also responsible for error detection.

Similar to the functionality described in connection with the downlink transmission by the non-terrestrial vehicle 704, the processing system 732 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the non-terrestrial vehicle 704 may be used by the transmitter 714 to select the appropriate coding and modulation schemes, and to facilitate spatial processing. The spatial streams generated by the transmitter 714 may be provided to different antenna(s) 716. The transmitter 714 may modulate an RF carrier with a respective spatial stream for transmission.

The uplink transmission is processed at the non-terrestrial vehicle 704 in a manner similar to that described in connection with the receiver function at the UE 702. The receiver 752 receives a signal through its respective antenna(s) 756. The receiver 752 recovers information modulated onto an RF carrier and provides the information to the processing system 784.

In the uplink, the processing system 784 provides demultiplexing between transport and logical channels, packet reassembly, deciphering, header decompression, control signal processing to recover IP packets from the UE 702. IP packets from the processing system 784 may be provided to the core network. The processing system 784 is also responsible for error detection.

For convenience, the UE 702, the non-terrestrial vehicle 704, and/or the network entity 706 are shown in FIGS. 7A-7C as including various components that may be configured according to the various examples described herein. It will be appreciated, however, that the illustrated blocks may have different functionality in different designs.

The various components of the UE 702, the non-terrestrial vehicle 704, and the network entity 706 may communicate with each other over data buses 734, 782, and 792, respectively. The components of FIGS. 7A-7C may be implemented in various ways. In some implementations, the components of FIGS. 7A-7C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 710 to 746 may be implemented by processor and memory component(s) of the UE 702 (e.g., by execution of appropriate code and/or by appropriate configuration of processor components). Similarly, some or all of the functionality represented by blocks 750 to 788 may be implemented by processor and memory component(s) of the non-terrestrial vehicle 704 (e.g., by execution of appropriate code and/or by appropriate configuration of processor components). Also, some or all of the functionality represented by blocks 790 to 798 may be implemented by processor and memory component(s) of the network entity 706 (e.g., by execution of appropriate code and/or by appropriate configuration of processor components). For simplicity, various operations, acts, and/or functions are described herein as being performed "by a UE," "by a base station," "by a non-terrestrial vehicle," "by a network entity," etc. However, as will be appreciated, such operations, acts, and/or functions may actually be performed by specific components or combinations of components of the UE, non-terrestrial vehicle, network entity, etc., such as the processing systems 732, 784, 794, the transceivers 710, 720, 750, and 770, the memory components 740, 786, and 796, the positioning components 742, 788, and 798, etc. Non-terrestrial vehicles, such as SVs 102/202/302, can provide at least two different types of cell coverage: (1) fixed cell coverage and (2) moving cell coverage.

Figure 8:
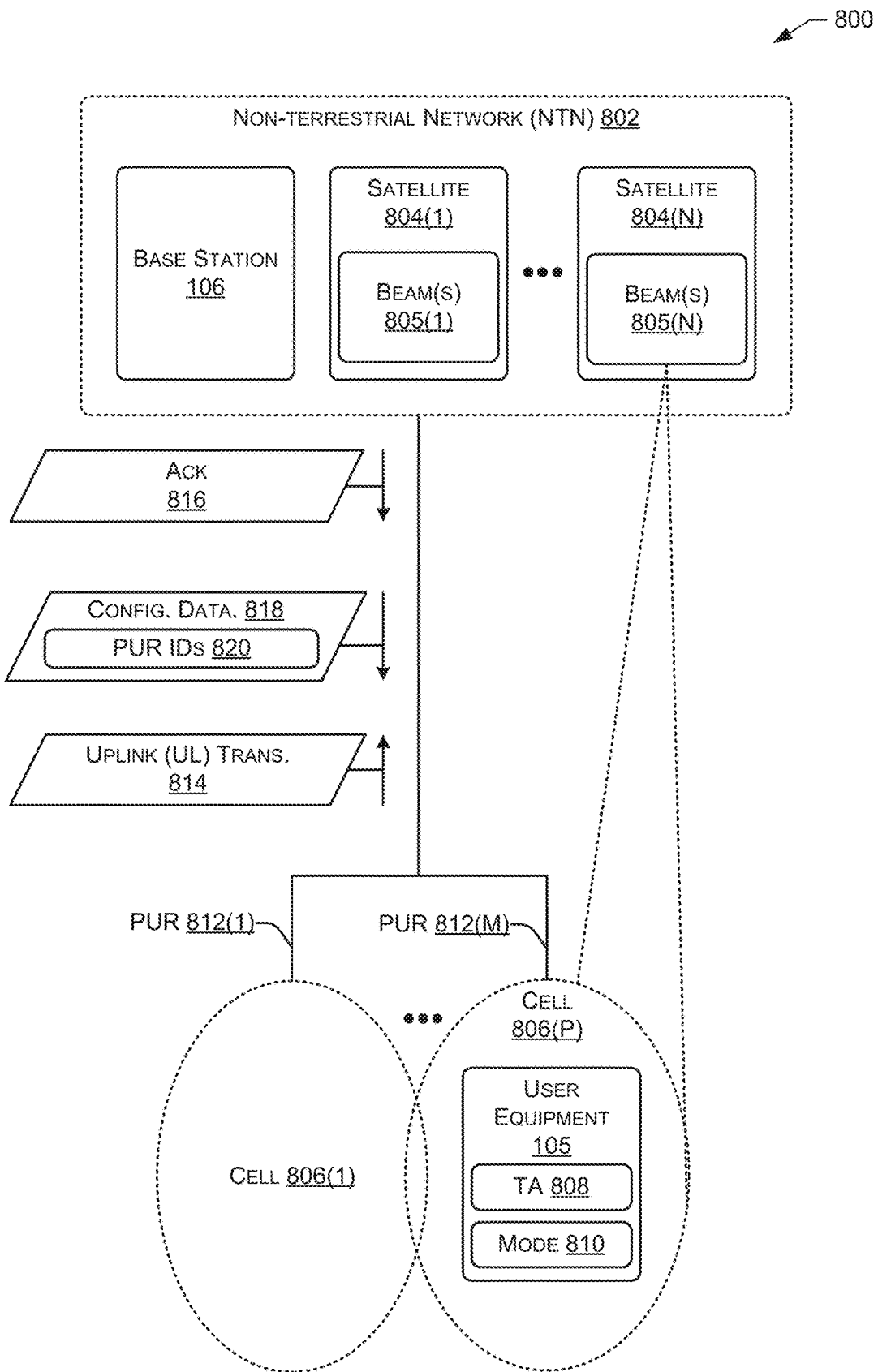
FIG. 8 illustrates a system in which multiple Pre-configured Uplink Resources (PURs) are configured for a user equipment (UE), according to various aspects of the disclosure.

FIG. 8 illustrates a system 800 in which multiple Preconfigured Uplink Resources (PURs) are configured for use by a user equipment (UE), according to various aspects of the disclosure. The system 800 includes a non-terrestrial network (NTN) 802 comprising multiple satellites 804(1) to 804(N) (N>0). For example, the satellites 804 may include the SV 102, the SV 202, the SV 302 or any combination thereof as described in FIGS. 1-6. The NTN 802 includes the base station 106 (e.g., an sNB, a gNB, or another type of base station). In some cases, the base station 106 may be a satellite. Each of the satellites 804 may have one or more beams. For example, the satellite 804(1) may have one or more beams 805(1) and the satellite 804(N) may have one or more beams 805(N).

The satellites 804 may be used to create multiple cells 806(1) to 806(P) (P>1). In FIG. 8, either the cell 806(1) or the cell 806(P) can be a serving cell of the UE 105. The UE 105 may store timing advance (TA) 808 and have an associated mode 810, e.g., one of an inactive mode, an idle mode, or an active mode. The UE 105 has multiple PURs 812(1) to 812(M) (M>0, M and P may be different) configured for use by the UE 105 to transmit Uplink (UL) data 814. In response to receiving the UL transmission 814, the base station 106 sends the acknowledgement (ACK) 816 using a downlink channel associated with one of the PURs 812 to the UE 105. The UE 105 may periodically send the UL transmission 814 at a time interval of, in some cases, between about one hundred milliseconds to about 10 seconds.

For the NTN 802, each of the satellites 804 may radiate one or more beams 805. Thus, the relationship between the cells 806 and the beams 805 can be either (i) each of the cells 806 has multiple of the beams 805 (e.g., cell 806(P) has two of the beams 805, as illustrated) or (ii) each of the cells 806 has a single one of the beams 805 (e.g., cell 806(1) has a first beam of the beams 805, cell 806(P) has a Pth beam of the beams 805).

In some cases, the base station 106 configures a single PUR for multiple cells to the UE. For example, the PUR 812(1) may be provided for the cells 806(1) to 806(P). In other cases, the base station 106 configures multiple PURs, with one PUR per beam. For example, a first of the beams 805 is used for the PUR 812(1) and a Pth of the beams 805 is used for the PUR 812(M). In still other cases, the base station 106 configures multiple PURs, with one PUR per cell. For example, the PUR 812(1) is associated with the cell 806(1) and the PUR 812(M) is associated with the cell 806(P).

When the mode 810 of the UE 105 is idle or inactive, the UE 105 may use one of the PURs 812 for sending the UL transmission 814. For example, when one or more of the PURs 812 are configured using a particular subset (e.g., of one or more) of the beams 805, then after the UE 105 enters the coverage area provided by the particular subset of beams 805, the UE 105 sends the UL transmission 814 using the configured PUR 812. As another example, when each PUR 812 is configured to correspond to each of the cells 806, then after the UE 105 enters the coverage area of one of the cells 806, the UE 105 sends the UL transmission 814 using the configured PUR 812.

To enable the base station 106 to configure the PURs 812 on a per beam basis or on a per cell basis, the base station 106 provides (e.g., in the RRC release message) configuration data 818 that includes a PUR identifier 820. The PUR identifier 820 may identify a particular subset of (e.g., one or more) beams 805 or a particular subset of the cells 806 for the UE 105 to use when sending the UL transmission 814. In some cases, the configuration data 818 may include time domain periodicity and offset as well as frequency domain recourses where the UE can send the UL transmission.

Though the PURs 812 may be a reserved resource for the UE 105, after the PURs 812 are configured for the UE 105, the NTN 802 is able to use resources occupied by the PURs 812 for other purposes when the UE 105 is not using the PURs 812. When the NTN 802 is a non-GEO network, beam switch time and cell reselection time for the UE 105 is predictable. Therefore, the NTN 802 can use resources occupied by the PURs 812 (e.g., that have been configured for the UE 105) for other purposes before the UE 105 enters the coverage area (e.g., either a coverage area provided by a subset of the beams 805 or by a subset of the cells 806) of the PURs 812.

Figure 9:
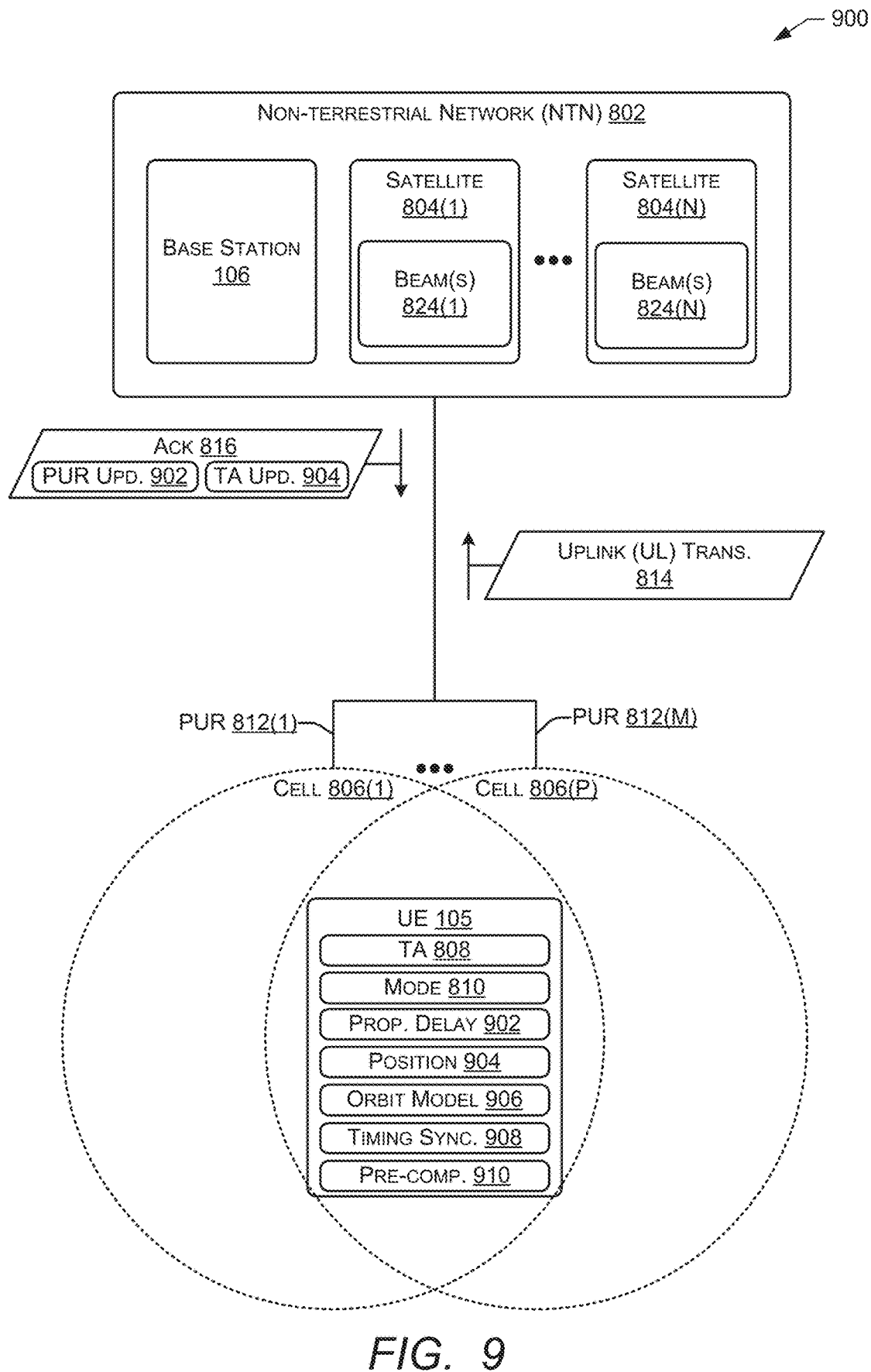
FIG. 9 illustrates a system in which an Acknowledgement (ACK) message is sent, according to various aspects of the disclosure.

FIG. 9 illustrates a system 900 in which an Acknowledgement (ACK) message is sent by the base station to the UE, according to various aspects of the disclosure, according to various aspects of the disclosure. For ease of understanding, FIG. 9 shows one PUR 812 associated with each of the cells 806. However, it should be understood that, in some cases, multiple ones of the PURs 812 may be associated with one of the cells 806 and that, in other cases, multiple cells 806 may be associated with a single one of the PURs 812.

After the base station 106 has configured multiple PURs 812 for use by the UE 105, the UE 105 selects one of the PURs 812 to send the UL transmission 814. For example, when the UE 105 is in a location in which the coverage area of two or more PURs (e.g., the cell 806(1) and the cell 806(P)) overlaps, then the UE 105 selects a particular PUR of the PURs 812.

The UE 105 can determine channel propagation delay 902 between the UE 105 and a particular satellite of the satellites 804 based on a position 904 of the UE 105 and an orbit model 906 of the particular satellite. The UE 105 can derive UL timing synchronization 908 and use the UL timing synchronization 908 to pre-compensate for the propagation delay 902. Thus, the UE 105 may pre-compensate for UL channel propagation delay 902 when the UL transmission 812 is sent using one of the PURs 812 to this particular satellite.

After the NTN 802 receives the UL transmission 814 from the UE 105 on one of the PURs 812 the NTN 802 sends the ACK 816 to the UE 105. The NTN 802 uses the ACK 816 to indicate whether the UL transmission 814 was successfully decoded by the NTN 802. The NTN 802 may use the ACK 816 to include (i) a PUR update 902 and (ii) a UL timing advance (TA) update 904. The PUR update 902 may include an update to the configuration of one or more of the PURs 812. The UL TA update 904 enables the UE 105 to refine the timing synchronization 908 with one or more of the satellites 804.

Figure 10:
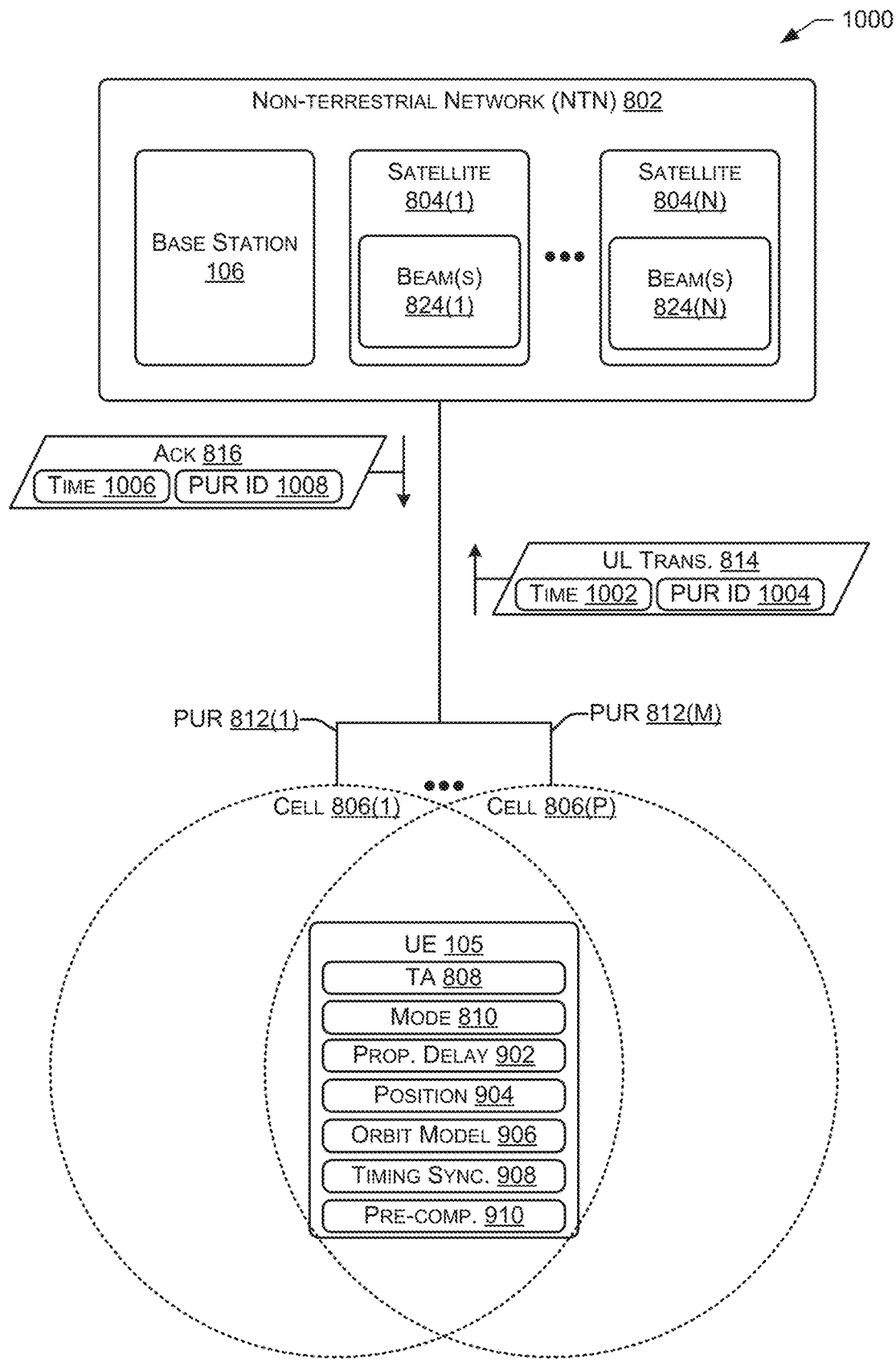
FIG. 10 illustrates a system in which the network, the UE, or both transmit updated PUR information, according to various aspects of the disclosure.

FIG. 10 illustrates a system 1000 in which the network, the UE, or both transmit a time and a PUR identifier, according to various aspects of the disclosure. For ease of understanding, FIG. 10 shows one PUR 812 associated with each of the cells 806. However, it should be understood that, in some cases, multiple ones of the PURs 812 may be associated with one of the cells 806 and that, in other cases, multiple cells 806 may be associated with a single one of the PURs 812.

When the UE 105 is in a location where the coverage areas of two (or more) PURs 812 overlap, the NTN 802, the UE 105, or both may use more than one of the PURs 812 to communicate with each other.

For example, in FIG. 10, the UE 105 is illustrated as being located in the overlap of the coverage areas of PUR 812(1) and PUR 812(M). The UE 105 sends the UL transmission 814 using a first PUR (e.g., PUR 812(1)) and then crosses the boundary into a coverage area of a second PUR (e.g., PUR 812(M)) before the UE 105 receives the ACK 816. In this example, the UE 105 uses the first PUR to send the UL transmission 812 and uses a second PUR (e.g., monitor a downlink channel associated with the second PUR) to receive the ACK 816.

To handle situations where more than one of the PURs 812 is used, the UE 105 may provide, in the UL transmission 814, a time 1002 and a PUR ID 1004. The time 1002 may indicate a time when the UE 105 will begin transmitting using the PUR (one of the PURs 812) associated with the PUR ID 1004. The time 1002 may indicate when the UE 105 will begin monitoring the downlink channel associated with the PUR (one of the PURs 812) associated with the PUR ID 1004 for the ACK 816. For example, the UE 105 may send the UL transmission 814 using the PUR 812(1) and indicates that at the time 1002 the UE 105 will begin listening on PUR 812(M) because the UE 105 is about to transition to a location served by the PUR 806(P). The NTN 802 sends the ACK 816 on the downlink channel associated with PUR 812(M).

To handle situations where more than one of the PURs 812 is used, the NTN 802 may provide, in the ACK 816, a time 1006 and a PUR ID 1008. The ACK 816 may instruct the UE 105 to (1) begin transmitting using the PUR associated with the PUR ID 1008 at the specified time 1006 or (2) begin monitoring the downlink channel associated with the PUR associated with the PUR ID 1008 at the specified time 1006 for the ACK 816. For example, the NTN 802 may send the ACK 816 using the PUR 812(1) and indicate that at the time 1006, the UE 105 should send the UL transmission 814 on PUR 812(M) because one or more of the satellites 804 are about to transition such that the UE 105 is to be served by the PUR 806(P). The UE 105 sends the UL transmission 814 on PUR 812(M) at the time 1006.

In this way, both the UE 105 and the NTN 802 can specify (1) when and on which of the PURs 812 the UE 105 transmits the UL transmission 814 and (2) when and on the downlink channel associated with which of the PURs 812 the NTN 802 sends the ACK 816. Thus, the UE 105 and the NTN 802 can compensate for a slight drift of the non-GEO satellites 804 or for small movements of a low mobility UE 105.

Figure 11:
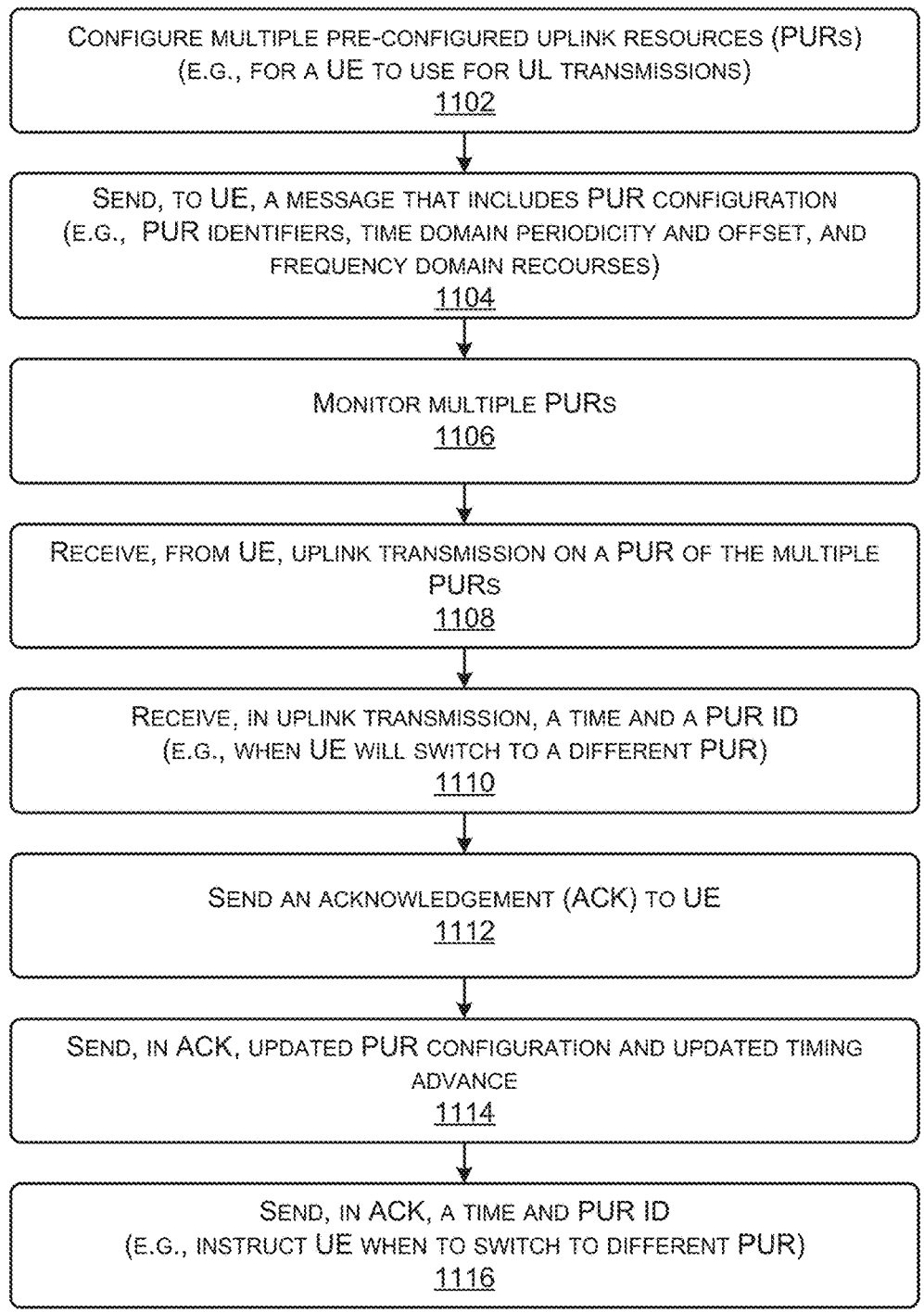
FIG. 11 is a block diagram of a process that includes monitoring multiple PURs, according to various aspects of the disclosure.
Figure 12:
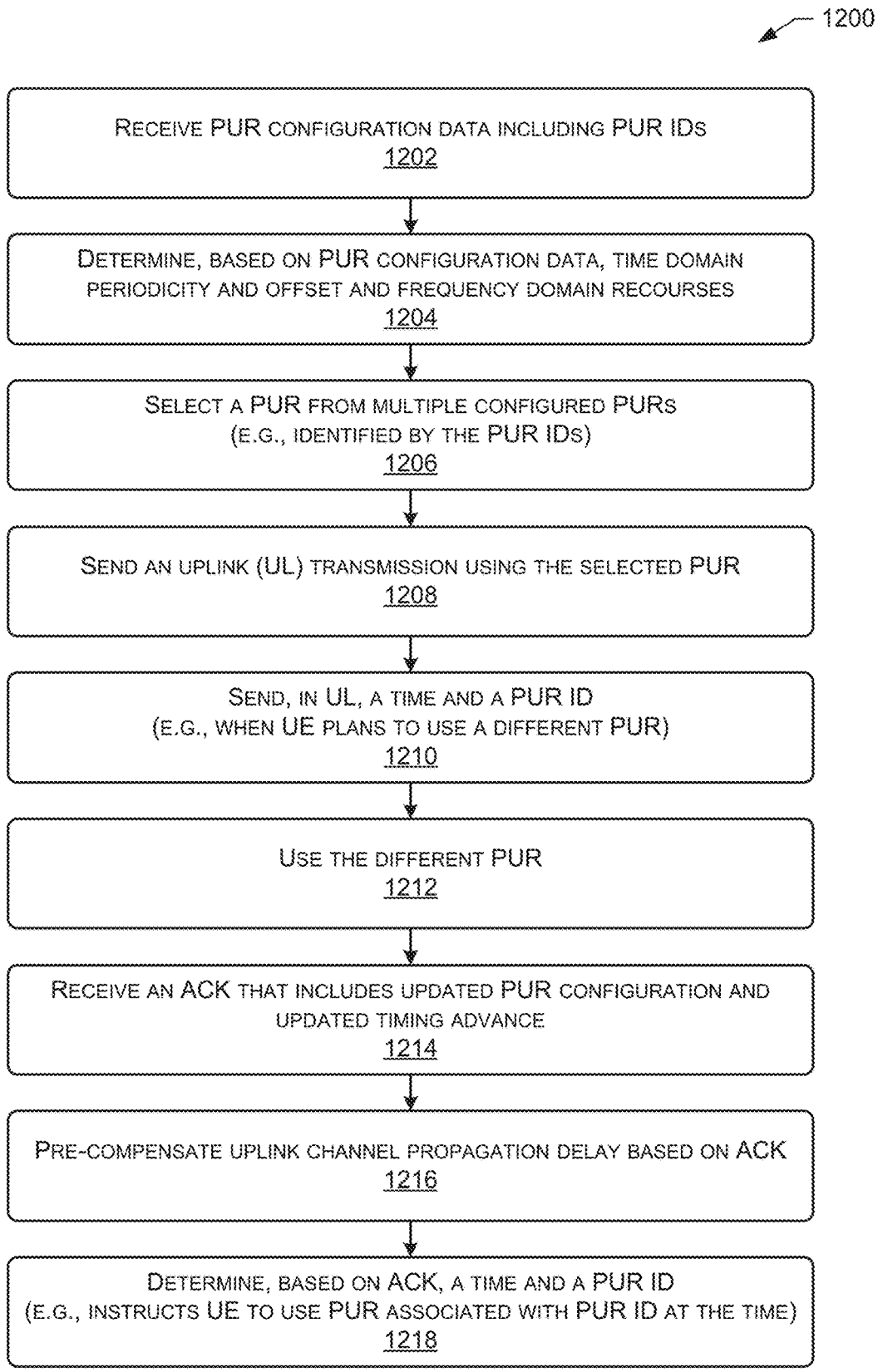
FIG. 12 is a block diagram of a process that includes selecting a PUR from multiple PURs, according to various aspects of the disclosure.

In the flow diagrams of FIGS. 11 and 12, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1100 and 1200 are described with reference to FIGS. 8, 9, and 10 as described above, although other models, frameworks, systems and environments may be used to implement these processes.

FIG. 11 is a block diagram of a process 1100 that includes monitoring multiple PURs, according to various aspects of the disclosure. The process 1100 is performed by a base station (gNB, sNB, or the like), such as the base station 106 as described herein.

At 1102, the process 1100 includes configuring multiple preconfigured uplink resources (e.g., for a UE to use for uplink transmissions). At 1104, the process 1100 includes sending, to the UE, a message that includes PUR configuration data (e.g., PUR identifiers, time domain periodicity and offset, frequency domain recourses, and the like). For example, in FIG. 8, the base station 106 may configure multiple PURs 812(1) to 812(M) for the UE 105. The UE 105 may select one of the PURs 812 to transmit the UL transmission 814. The base station 106 may send the configuration data 818 that includes the one or more PUR identifiers 820 that have been configured for the UE 105. The configuration data 818 may also include other data, such as, for example, time domain periodicity and offset, frequency domain recourses, and the like. The Radio Resource Control (RRC) protocol has an RRC CONNECTION RELEASE message to instruct the UE 105 to release an RRC connection. The UE 105 receives the RRC release message from the base station 106 when the UE 105 switches from RRC to idle. In some cases, the configuration data 818 may be sent in an RRC connection release message. In other cases, the configuration data 818 may be sent in the ACK 816.

At 1106, the process may monitor multiple PURs, such as the PURs 812(1) to 812(M) for the UE 105. At 1108, the process may receive from the UE, an uplink transmission on a PUR of the multiple PURs. At 1110, the process may receive, in the uplink transmission, a time and a PUR identifier. At 1112, the process may send an acknowledgment (ACK) to the UE (e.g., acknowledging the uplink transmission). For example, in FIG. 8, the base station 106 may monitor the PURs 812 that have been configured for use by the UE 105. The base station 106 may determine that the uplink transmission 814 has been sent using one of the PURs 812. In response, the base station 106 may send the ACK 816 acknowledging the UL transmission 814. For example, in FIG. 10, the base station 106 may receive the time 1002 and the PUR identifier 1004. The time 1002 may indicate a time when the UE 105 will begin transmitting using the PUR (one of the PURs 812) associated with the PUR ID 1004. The time 1002 may indicate when the UE 105 will begin monitoring the PUR (one of the PURs 812) associated with the PUR ID 1004 for the ACK 816.

At 1114, the process may send, in the ACK, updated PUR configuration information and updated timing advance information. For example, in FIG. 9, the base station 106 may send the ACK 816 that includes the PUR configuration update 902 identifying any changes to the configured PURs 812. The ACK 816 may include the timing advance update 904.

At 1116, the process may send, in the ACK, a time and a PUR ID (e.g., instructing the UE when to switch to a different PUR). For example, in FIG. 10, the base station 106 may send, in the ACK 816, the time 1006 and the PUR identifier 1008. The ACK 816 may instruct the UE 105 to begin transmitting using the PUR associated with the PUR ID 1008 at the specified time 1006. The ACK 816 may instruct the UE 105 to begin monitoring the PUR associated with the PUR ID 1008 at the specified time 1006 for the ACK 816.

FIG. 12 is a block diagram of a process 1200 that includes selecting a PUR from multiple PURs, according to various aspects of the disclosure. The process 1200 is performed by user equipment (UE), such as the UE 105 as described herein.

At 1202, the process may receive PUR configuration data, including PUR identifiers (of PURs configured for the UE). At 1204, the process may determine, based on the PUR configuration data, time domain periodicity and offset, frequency domain recourses, and the like. For example, in FIG. 8, the UE 105 may receive the PUR configuration data 818 that includes the PUR identifiers 820 that have been configured for use by the UE 105. The UE 105 may determine time domain periodicity and offset, frequency domain recourses, and the like based on the PUR configuration data 818.

At 1206, the process may select a PUR from multiple configured PURs (e.g., the multiple PURs identified by the PUR IDs received at 1202). At 1208, the process may send an uplink transmission using the selected PUR. For example, in FIG. 8, the UE 105 may select one of the PURs 812 and send the uplink transmission 814 using the selected PUR.

At 1210, the process may send, in the uplink transmission, a time and a PUR identifier (e.g., indicating when the UE plans to use a different PUR). At 1212, the process may use the different PUR. For example, in FIG. 10, the UE 105 may send the uplink transmission 814 and include the time 1002 and the PUR identifier 1004. The time 1002 may indicate when the UE 105 will begin transmitting using the PUR (one of the PURs 812) associated with the PUR ID 1004. The time 1002 may indicate when the UE 105 will begin monitoring the PUR (one of the PURs 812) associated with the PUR ID 1004 for the ACK 816.

At 1214, the process may receive an acknowledgment (ACK) that includes updated PUR configuration information and updated timing advance information. At 1216, the process may pre-compensate uplink channel propagation delay based on the ACK. For example, in FIG. 9, the UE 105 may receive the ACK 816 from the base station 106. The ACK 816 may include the PUR configuration information update 902 and the TA update 904. The UE 105 may pre-compensate for uplink channel propagation delay based on the PUR configuration information update 902 and the TA update 904.

At 1218, the process may determine based on the ACK, a time and a PUR identifier (e.g., instructing the UE to use the PUR associated with the PUR identifier). For example, in FIG. 10, the UE 105 may receive the ACK 816 that includes the time 1006 and the PUR identifier 1008. The ACK 816 may instruct the UE 105 to begin transmitting using the PUR associated with the PUR ID 1008 at the specified time 1006. The ACK 816 may instruct the UE 105 to begin monitoring the PUR associated with the PUR ID 1008 at the specified time 1006 for the ACK 816.

Figure 13:
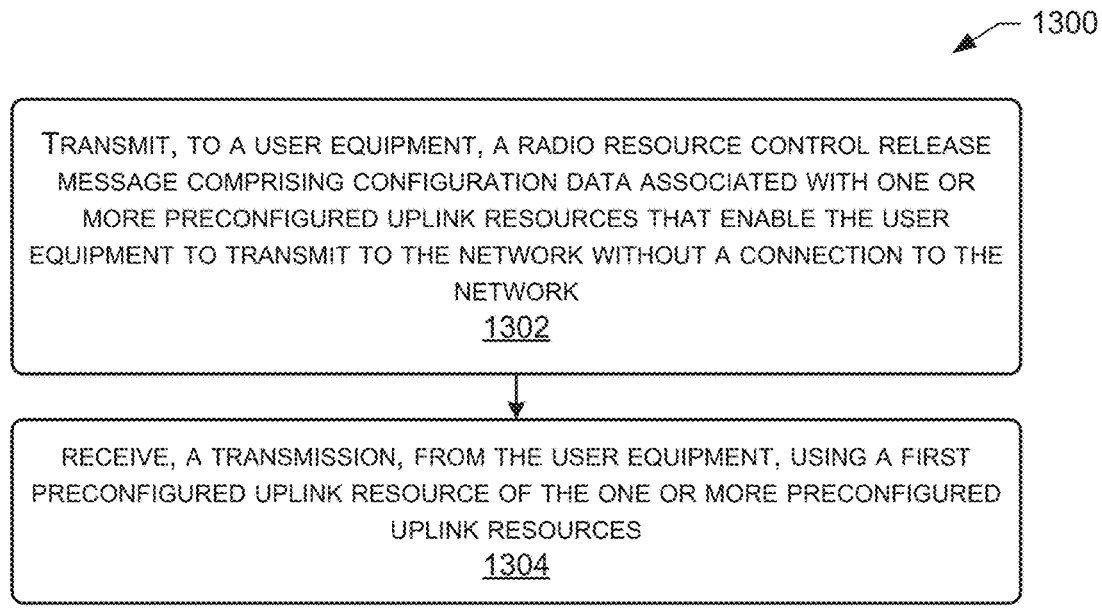
FIG. 13 is a block diagram of a process that includes transmitting a radio resource control release (RRCR) message to a UE, according to various aspects of the disclosure.

FIG. 13 is a block diagram of a process 1300 that includes transmitting a radio resource control release (RRCR) message to a UE, according to various aspects of the disclosure. The process 1300 is performed by a base station (gNB, sNB, or the like), such as the base station 106 as described herein.

At 1302, the process transmits, to a UE, a radio resource control release message that includes configuration data associated with one or more PURs. The PURs enable the UE to transmit to the network without a network connection and without a grant of access from the network. At 1304, the process receives a transmission from the UE using a first PUR of the one or more PURs. For example, in FIG. 8, the base station 106 sends (e.g., in an RRCR message) the configuration 818, including the PUR identifiers 820. The UE 105 performs the UL 814 using one of the PURs 812 (that are identified by the PUR identifiers 820), without a connection (or a grant of access) to the NTN 802.

Figure 14:
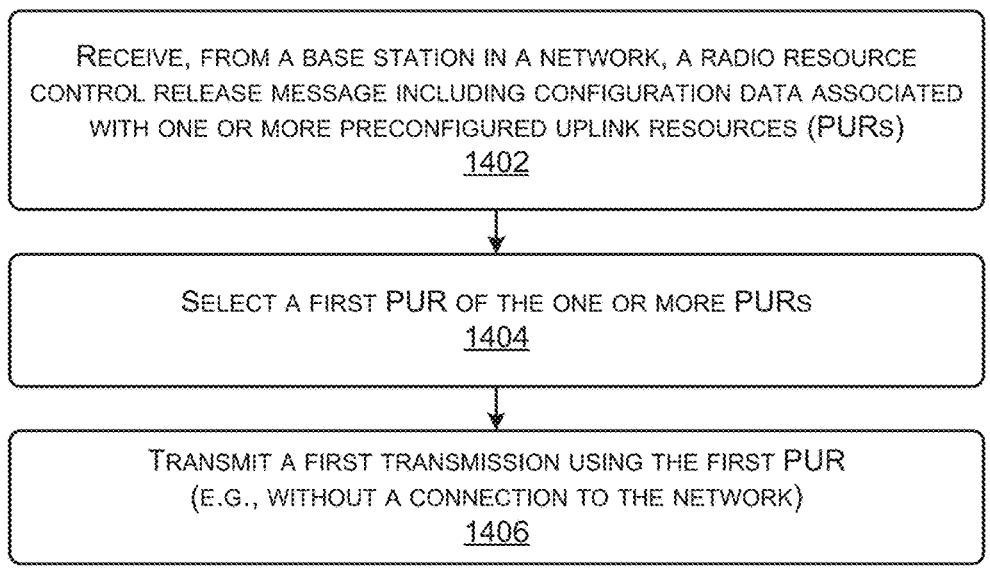
FIG. 14 is a block diagram of a process that includes selecting a first preconfigured PUR, according to various aspects of the disclosure.

FIG. 14 is a block diagram of a process 1400 that includes selecting a first preconfigured PUR, according to various aspects of the disclosure. The process 1400 is performed by user equipment (UE), such as the UE 105 as described herein.

At 1402, the process receives from a base station in a network, a radio resource control release message comprising configuration data associated with one or more preconfigured uplink resources (PURs). At 1404, the process selects a first preconfigured uplink resource of the one or more preconfigured uplink resources. At 1406, the process transmits a first transmission using the first preconfigured uplink resource (e.g., without a connection to the network and without a grant of access to the network). For example, in FIG. 8, the UE 105 receives (e.g., in an RRCR message) the configuration data 818, including the PUR identifiers 820. The UE 105 selects one of the PURs 812 (e.g., identified by the PUR identifiers 820) and performs the UL 814 using the selected one of the PURs 812, without a connection (or a grant of access) to the NTN 802.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Clause 1. A method comprising: receiving, by a user equipment, from a base station of a serving cell in a network comprising a plurality of mobile cells, a radio resource control release message comprising configuration data associated with one or more preconfigured uplink resources, wherein the one or more preconfigured uplink resources enable the user equipment to perform a transmission without a connection to the network; selecting, by the user equipment, a first preconfigured uplink resource of the one or more preconfigured uplink resources; and transmitting, by the user equipment, a first transmission using the first preconfigured uplink resource.

Clause 2. The method of clause 1, wherein the network comprises a non-terrestrial network in which the plurality of mobile cells includes one or more satellites in a non-geosynchronous orbit.

Clause 3. The method of clause 2, wherein: each satellite of the one or more satellites comprises one or more beams; the one or more beams are associated with the plurality of mobile cells; and each of the one or more preconfigured uplink resources are configured for each beam of the one or more beams.

Clause 4. The method of clause 3, wherein the configuration data comprises: one or more beam identifiers, each beam identifier of the one or more beam identifiers corresponding to each beam of the one or more beams.

Clause 5. The method of any of clauses 2 to 4, further comprising: pre-compensating an uplink channel propagation delay, by the user equipment, for the first transmission using the first preconfigured uplink resource, based on: a position of the user equipment; and orbit information for the one or more satellites.

Clause 6. The method of any of clauses 1 to 5, further comprising: selecting a second preconfigured uplink resource of the one or more preconfigured uplink resources; and transmitting, by the user equipment, a second transmission using the second preconfigured uplink resource, wherein a time interval between the first transmission and the second transmission comprises between about one hundred milliseconds to about 10 seconds.

Clause 7. The method of any of clauses 1 to 6, wherein: each preconfigured uplink resource of the one or more preconfigured uplink resources is configured for each mobile cell of the plurality of mobile cells.

Clause 8. The method of any of clauses 1 to 7, wherein: the user equipment is associated with the plurality of mobile cells and each preconfigured uplink resources has a mobile cell identifier that identifies a particular mobile cell of the plurality of mobile cells.

Clause 9. The method of any of clauses 1 to 8, wherein: the configuration data includes time domain periodicity and offset and frequency domain recourses to perform the transmission.

Clause 10. The method of any of clauses 1 to 9, wherein: two or more preconfigured uplink resources of the one or more preconfigured uplink resources are configured for transmission to a particular mobile cell of the plurality of mobile cells.

Clause 11. The method of any of clauses 1 to 10, wherein: receiving, by the user equipment, an acknowledgement message after transmitting the first transmission using the first preconfigured uplink resource, the acknowledgement message comprising at least one of: an indication that the first transmission was successfully received; updated configuration data associated with the one or more preconfigured uplink resources; and an uplink timing advance.

Clause 12. The method of clause 11, further comprising: updating, by the user equipment, an uplink timing synchronization based at least in part on the uplink timing advance update to create updated uplink timing synchronization; and transmitting, by the user equipment, a second transmission based on the updated uplink timing synchronization.

Clause 13. The method of any of clauses 1 to 12, further comprising: receiving, by the user equipment, an acknowledgement message after transmitting the first transmission using the first preconfigured uplink resource, wherein the acknowledgement message is received on a downlink resource associated with a second preconfigured uplink resource of the one or more preconfigured uplink resources.

Clause 14. The method of any of clauses 1 to 13, wherein the first transmission includes a start time: to use a second preconfigured uplink resource for a second transmission; or to monitor an acknowledgement message on a downlink resource associated with a second preconfigured uplink resource.

Clause 15. The method of any of clauses 1 to 14, further comprising: receiving, by the user equipment, an acknowledgement message associated with the first transmission, wherein the acknowledgement message includes a time for the user equipment to: use a different preconfigured uplink resource to send an additional transmission; or monitor a different downlink resource associated with a different preconfigured uplink resource.

Clause 16. The method of any of clauses 1 to 15, wherein the one or more preconfigured uplink resources include one preconfigured uplink resource that is configured for multiple mobile cells.

Clause 17. A method in a network comprising a plurality of mobile cells, the method comprising: transmitting, from an originating mobile cell in the network, to a user equipment, a radio resource control release message comprising configuration data associated with one or more preconfigured uplink resources, wherein the one or more preconfigured uplink resources enable the user equipment transmit to the network without a connection to the network; and receiving, by a receiving mobile cell in the network, a first transmission, by the user equipment, using a first preconfigured uplink resource of the one or more preconfigured uplink resources.

Clause 18. The method of clause 17, wherein: the network comprises a non-terrestrial network; and the mobile cells comprise a plurality of satellites in a non-geosynchronous orbit.

Clause 19. The method of any of clauses 17 to 18, wherein the receiving mobile cell comprises the originating mobile cell.

Clause 20. The method of any of clauses 17 to 19, wherein: each of the one or more preconfigured uplink resources are configured per beam; and the configuration data comprises a beam identifier that identifies a particular beam.

Clause 21. The method of any of clauses 17 to 20, wherein: each preconfigured uplink resources of the one or more preconfigured uplink resources are configured per mobile cell; the user equipment is associated with a plurality of mobile cells; and each preconfigured uplink resource has a mobile cell identifier that identifies one mobile cell of the plurality of mobile cells.

Clause 22. The method of any of clauses 17 to 21, wherein the configuration data includes time domain periodicity and offset, and frequency domain recourses for the user equipment to use for an uplink transmission.

Clause 23. The method of any of clauses 17 to 22, wherein two or more preconfigured uplink resources of the one or more preconfigured uplink resources are configured for uplink transmission to one mobile cell.

Clause 24. The method of any of clauses 17 to 23, wherein the one or more preconfigured uplink resources comprise a single preconfigured uplink resource that is configured for multiple mobile cells.

Clause 25. The method of any of clauses 17 to 24, wherein the receiving mobile cell comprises a mobile cell that is different than the originating mobile cell.

Clause 26. The method of any of clauses 17 to 25, further comprising: transmitting, in response to the first transmission, an acknowledgement message comprising at least one of: updated configuration data associated with the one or more preconfigured uplink resources, or an uplink timing advance.

Clause 27. The method of any of clauses 17 to 26, further comprising: transmitting to the user equipment, in response to the first transmission, an acknowledgement message on a downlink resource associated with a second preconfigured uplink resource of the one or more preconfigured uplink resources.

Clause 28. The method of any of clauses 17 to 27, wherein the first transmission includes a start time: to use a second preconfigured uplink resource for a second transmission, or to monitor an acknowledgement message on a downlink resource associated with a second preconfigured uplink resource.

Clause 29. The method of any of clauses 17 to 28, further comprising: transmitting, to the user equipment, an acknowledgement message associated with the first transmission, wherein the acknowledgement message includes a time for the user equipment: to use a different preconfigured uplink resource, or to monitor a different downlink resource associated with a different preconfigured uplink resource.

Clause 30. The method of any of clauses 17 to 29, further comprising: using at least one preconfigured uplink resource configured to the user equipment for other uses before the user equipment enters a coverage area associated with the at least one preconfigured uplink resource, wherein the coverage area is based on a beam coverage area or a cell coverage area.

Clause 31. An apparatus comprising a memory and at least one processor communicatively coupled to the memory, the memory and the at least one processor configured to perform a method according to any of clauses 1 to 30.

Clause 32. An apparatus comprising means for performing a method according to any of clauses 1 to 30.

Clause 33. A non-transitory computer-readable medium storing computer-executable instructions, the computer-executable comprising at least one instruction for causing a computer or processor to perform a method according to any of clauses 1 to 30.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communication by a user equipment in a network comprising a plurality of mobile cells, comprising:
receiving a radio resource control release message comprising configuration data, wherein the configuration data indicates one or more preconfigured uplink resources and indicates an association between each one of the mobile cells and a corresponding subset of the one or more preconfigured uplink resources, wherein the one or more preconfigured uplink resources enable the user equipment to perform a transmission without a connection to the network;
selecting a first preconfigured uplink resource from a particular subset associated with one of the mobile cells, said selection being based on the user equipment being in a coverage area of the one of the mobile cells; and
transmitting a first transmission using the first preconfigured uplink resource.

2. The method of claim 1, wherein, at least one of:
the network comprises a non-terrestrial network in which the plurality of mobile cells includes one or more satellites in a non-geosynchronous orbit; or
the configuration data includes time domain periodicity and offset and frequency domain recourses to perform the first transmission.

3. The method of claim 2, wherein:
each satellite of the one or more satellites comprises one or more beams;
the one or more beams are associated with the plurality of mobile cells;
each of the one or more preconfigured uplink resources is configured for each beam of the one or more beams; and
the configuration data further includes one or more beam identifiers, each beam identifier of the one or more beam identifiers corresponding to each beam of the one or more beams.

4. The method of claim 2, further comprising:
pre-compensating an uplink channel propagation delay for the first transmission using the first preconfigured uplink resource, the pre-compensation being based on at least one of:
a position of the user equipment; or
orbit information for the one or more satellites.

5. The method of claim 1, further comprising:
selecting a second preconfigured uplink resource of the one or more preconfigured uplink resources; and
transmitting a second transmission using the second preconfigured uplink resource,
wherein a time interval between the first transmission and the second transmission comprises between about one hundred milliseconds to about 10 seconds.

6. The method of claim 1, wherein:
each preconfigured uplink resource of the one or more preconfigured uplink resources is configured for each mobile cell of the plurality of mobile cells.

7. The method of claim 1, wherein:
the user equipment is associated with the plurality of mobile cells and each preconfigured uplink resource has a mobile cell identifier that identifies a particular mobile cell of the plurality of mobile cells.

8. The method of claim 1, wherein:
two or more preconfigured uplink resources of the one or more preconfigured uplink resources are configured for transmission to a particular mobile cell of the plurality of mobile cells.

9. The method of claim 1, further comprising, at least one of:
receiving an acknowledgement message after transmitting the first transmission using the first preconfigured uplink resource, the acknowledgement message comprising at least one of:
an indication that the first transmission was successfully received;
updated configuration data associated with the one or more preconfigured uplink resources; or
an uplink timing advance;
updating an uplink timing synchronization based at least in part on the uplink timing advance update to create an updated uplink timing synchronization; or
transmitting a second transmission based on the updated uplink timing synchronization.

10. The method of claim 1, further comprising:
receiving an acknowledgement message after transmitting the first transmission using the first preconfigured uplink resource, wherein the acknowledgement message is received via a downlink resource associated with a second preconfigured uplink resource of the one or more preconfigured uplink resources.

11. The method of claim 1, wherein the first transmission includes a start time where the user equipment is configured to:
transmit using a second preconfigured uplink resource for a second transmission; or
monitor for an acknowledgement message via a downlink resource associated with the second preconfigured uplink resource.

12. The method of claim 1, further comprising:
receiving an acknowledgement message associated with the first transmission, wherein the acknowledgement message includes a time for the user equipment to:
transmit using a different preconfigured uplink resource to send an additional transmission; or
monitor for a different downlink resource associated with a different preconfigured uplink resource.

13. The method of claim 1, wherein the one or more preconfigured uplink resources include one preconfigured uplink resource that is configured for at least two of the plurality of mobile cells.

14. A user equipment in a network comprising a plurality of mobile cells, comprising:
a transceiver;
one or more processors; and
one or more non-transitory computer-readable storage media to store instructions executable by the one or more processors to cause the user equipment to:
receive, via the transceiver, a radio resource control release message comprising configuration data, wherein the configuration data indicates one or more preconfigured uplink resources and indicates an association between each one of the mobile cells and a corresponding subset of the one or more preconfigured uplink resources, wherein the one or more preconfigured uplink resources enable the user equipment to perform a transmission without a connection to the network;
select a first preconfigured uplink resource from a particular subset associated with one of the mobile cells, said selection being based on the user equipment being in a coverage area of one of the mobile cells; and
transmit, via the transceiver, a first transmission using the first preconfigured uplink resource.

15. The user equipment of claim 14, wherein, at least one of:
the network comprises a non-terrestrial network in which the plurality of mobile cells includes one or more satellites in a non-geosynchronous orbit; or
the configuration data includes time domain periodicity and offset and frequency domain recourses to perform the first transmission.

16. The user equipment of claim 15, wherein:
each satellite of the one or more satellites comprises one or more beams;
the one or more beams are associated with the plurality of mobile cells;
each of the one or more preconfigured uplink resources is configured for each beam of the one or more beams; and
the configuration data further includes one or more beam identifiers, each beam identifier of the one or more beam identifiers corresponding to each beam of the one or more beams.

17. The user equipment of claim 15, the instructions further executable by the one or more processors to:
pre-compensate an uplink channel propagation delay, by the user equipment, for the first transmission using the first preconfigured uplink resource, the pre-compensation being based on at least one of:
a position of the user equipment; or
orbit information for the one or more satellites.

18. The user equipment of claim 14, the instructions further executable by the one or more processors to:
select a second preconfigured uplink resource of the one or more preconfigured uplink resources; and
transmit, via the transceiver, a second transmission using the second preconfigured uplink resource,
wherein a time interval between the first transmission and the second transmission comprises between about one hundred milliseconds to about 10 seconds.

19. The user equipment of claim 14, wherein:
each preconfigured uplink resource of the one or more preconfigured uplink resources is configured for each mobile cell of the plurality of mobile cells.

20. The user equipment of claim 14, wherein:
the user equipment is associated with the plurality of mobile cells and each preconfigured uplink resource has a mobile cell identifier that identifies a particular mobile cell of the plurality of mobile cells.

21. The user equipment of claim 14, wherein:
two or more preconfigured uplink resources of the one or more preconfigured uplink resources are configured for transmission to a particular mobile cell of the plurality of mobile cells.

22. The user equipment of claim 14, the instructions further executable by the one or more processors to, at least one of:
receive, via the transceiver, an acknowledgement message after transmitting the first transmission using the first preconfigured uplink resource, the acknowledgement message comprising at least one of:
an indication that the first transmission was successfully received;
updated configuration data associated with the one or more preconfigured uplink resources; or
an uplink timing advance;
update an uplink timing synchronization based at least in part on the uplink timing advance update to create an updated uplink timing synchronization; or
transmit, via the transceiver, a second transmission based on the updated uplink timing synchronization.

23. The user equipment of claim 14, the instructions further executable by the one or more processors to:
receive, via the transceiver, an acknowledgement message after transmitting the first transmission using the first preconfigured uplink resource, wherein the acknowledgement message is received via a downlink resource associated with a second preconfigured uplink resource of the one or more preconfigured uplink resources.

24. The user equipment of claim 14, wherein the first transmission includes a start time where the user equipment is configured to:
transmit, via the transceiver, using a second preconfigured uplink resource for a second transmission; or
monitor for an acknowledgement message via a downlink resource associated with the second preconfigured uplink resource.

25. The user equipment of claim 14, the instructions further executable by the one or more processors to:
receive, via the transceiver, an acknowledgement message associated with the first transmission, wherein the acknowledgement message includes a time for the user equipment to:
transmit, via the transceiver, using a different preconfigured uplink resource to send an additional transmission; or
monitor fora different downlink resource associated with a different preconfigured uplink resource.

26. The user equipment of claim 14, wherein the one or more preconfigured uplink resources include one preconfigured uplink resource that is configured for at least two of the plurality of mobile cells.

27. A method for wireless communication by a base station of a serving cell in a network comprising a plurality of mobile cells, comprising:
transmitting, to a user equipment, a radio resource control release message comprising configuration data, wherein the configuration data indicates one or more preconfigured uplink resources and indicates an association between each one of the mobile cells and a corresponding subset of the one or more preconfigured uplink resources, wherein the one or more preconfigured uplink resources enable the user equipment to transmit to the network without a connection to the network; and
receiving a first transmission, from the user equipment based on the user equipment being in a coverage area of one of the mobile cells, using a first preconfigured uplink resource from a particular subset associated with the one of the mobile cells.

28. The method of claim 27, further comprising:
transmitting, in response to the first transmission, an acknowledgement message comprising at least one of:
updated configuration data associated with the one or more preconfigured uplink resources, or
an uplink timing advance.

29. A base station of a serving cell in a network comprising a plurality of mobile cells, comprising:
a transceiver;
one or more processors; and
one or more non-transitory computer-readable storage media to store instructions executable by the one or more processors to:
transmit, via the transceiver, to a user equipment, a radio resource control release message comprising configuration data, wherein the configuration data indicates one or more preconfigured uplink resources and indicates an association between each one of the mobile cells and a corresponding subset of the one or more preconfigured uplink resources, wherein the one or more preconfigured uplink resources enable the user equipment to transmit to the network without a connection to the network; and
receive a first transmission, via the transceiver from the user equipment based on the user equipment being in a coverage area of one of the mobile cells and using a first preconfigured uplink resource from a particular subset associated with the one of the mobile cells.

30. The base station of claim 29, the instructions further executable by the one or more processors to:
transmit, via the transceiver to the user equipment, an acknowledgement message associated with the first transmission, wherein the acknowledgement message includes a time for the user equipment to:
transmit, via the transceiver, using a different preconfigured uplink resource, or
monitor fora different downlink resource associated with a different preconfigured uplink resource.

\* \* \* \* \*